United States Patent [19]
Ogawa

[11] Patent Number: 5,285,431
[45] Date of Patent: Feb. 8, 1994

[54] INFORMATION STORAGE DEVICE WITH HEAD POSITION DETECTION OUTSIDE A USER UTILIZABLE REGION AND AN OPTICAL DISK DRIVE DEVICE HAVING TARGET VELOCITY-CONTROLLED HEAD ACTUATION

[75] Inventor: Masaharu Ogawa, Amagasaki, Japan

[73] Assignee: Mitsubishi Denki Kabushiki Kaisha, Tokyo, Japan

[21] Appl. No.: 582,647

[22] Filed: Sep. 13, 1990

[51] Int. Cl.$^5$ .............................................. G11B 17/22
[52] U.S. Cl. ........................................ 369/32; 369/41; 369/44.26; 369/44.28; 369/53
[58] Field of Search ............ 369/32, 41, 44.26, 44.28, 369/53, 54

[56] References Cited

U.S. PATENT DOCUMENTS

| | | | |
|---|---|---|---|
| 4,731,771 | 3/1988 | Maeda et al. | 369/44 |
| 4,835,752 | 5/1989 | Nakatsu et al. | 369/41 |

FOREIGN PATENT DOCUMENTS

| | | |
|---|---|---|
| 0138275 | 4/1985 | European Pat. Off. . |
| 3604604 | 9/1986 | Fed. Rep. of Germany . |
| 61-233305 | 10/1986 | Japan . |
| 61-269262 | 11/1986 | Japan . |
| 2029051 | 3/1980 | United Kingdom . |

OTHER PUBLICATIONS

Patent Abstracts of Japan, vol. 6, No. 195 (P-146) (1073) Oct. 5, 1982.
Patent Abstracts of Japan, vol. 6, No. 248 (P-160) (1126) Dec. 7, 1982.
Research Disclosure, vol. 2244, No. 265, May 1986, New York, p. 253 "Tracking Acquire on an Optical Disk".
Patent Abstracts of Japan, vol. 9, No. 246 (P-393) (1969) Oct. 3, 1985.
Patent Abstracts of Japan, vol. 10, No. 266, (P-496) (2322) Sep. 11, 1986.

Primary Examiner—Robert J. Pascal
Assistant Examiner—Reginald A. Ratliff
Attorney, Agent, or Firm—Jacobson, Price, Holman & Stern

[57] ABSTRACT

In a disk drive device comprising an optical head having a movable part including a lens for focusing a light spot on a track of an optical disk and a photodetector which receives the light reflected from the track and provides a photoelectric conversion signal, a head actuator moves the movable part in a radial direction of the optical disk when the optical head accesses the tracks of the optical disk, and a motion detection means receives the photoelectric conversion signal and outputs a track-traverse motion signal representing the track-traverse motion of the light spot. An acceleration detecting means detects the acceleration of the head actuator. A target velocity generating means generates a track-traversing target velocity determined by the output of acceleration detecting means and the photoelectric conversion signal. A state-observer means receives the output signals from the acceleration detecting means and the motion detecting means, and outputs an estimated track-traverse velocity of the light spot. A head actuator drive circuit controls the head actuator such that the estimated velocity coincides with the target velocity.

20 Claims, 29 Drawing Sheets

INFORMATION STORAGE DEVICE WITH HEAD POSITION DETECTION OUTSIDE A USER UTILIZABLE REGION AND AN OPTICAL DISK DRIVE DEVICE HAVING TARGET VELOCITY-CONTROLLED HEAD ACTUATION

CROSS-REFERENCE TO RELATED APPLICATIONS

This application is a continuation-in-part of application Ser. No. 07/492,315 filed Mar. 5, 1990, which in turn is a continuation of application Ser. No. 07/127,391, filed Dec. 2, 1987, both now abandoned.

FIELD OF THE INVENTION

The present invention relates to an optical disk drive device, and more particularly, to an optical disk drive device which controls access of a light spot to an arbitrary track on an optical disk.

The present invention also relates to optical disk devices or similar information storage devices which have a head movable with respect to an optical disk, etc., and can write, read or erase the information.

The present invention also relates to an information storage device capable of recording, reproducing, or erasing the information on or from an information storage medium having multiple tracks. More specifically, the invention relates to an information storage device, which even in the case of failure of a seeking operation or the like can be quickly controlled for stable operation.

BACKGROUND OF THE INVENTION

FIG. 1 shows a block diagram of an access control system described in Japanese Patent Application No. 101,439/1985 filed by the assignee of the present application on May 15, 1985 for an "Optical Disk Drive Device".

As illustrated, an optical disk 101 has a plurality of recording tracks on the disk. The tracks comprise series of pits disposed at a high density and arranged in a circular or spiral form. The disk 101 is fitted onto a spindle and is rotated by a disk-drive motor 102. The disk-drive motor 102 is rotated under the control of a disk-motor-drive control system 103.

An optical head 104 forms a light spot on the optical disk 101. The light spot is moved in the radial direction of the optical disk 101. The optical head 104 comprises a frame 105, a source of light such as a semiconductor laser 106, a collimating lens 107, a polarization beam splitter 108, a λ/4 plate 109, an optical-path changing mirror 110, an objective lens 111 which focuses the light beam from the light source 106 onto the medium surface of the optical disk 101 and forms a light spot 115 on the surface, a tracking actuator 112 which provides fine or microscopic movements of the objective lens 111 in the radial direction of the optical disk 101 for accurate positioning of the light spot on a recording track of the optical disk, and a split-photodetector 113 which has a pair of sensor parts adjacent to each other for detecting the return light reflected from the optical disk 101, and produces a pair of electrical signals corresponding to the amount of light received at the respective sensor parts.

An addition/subtraction amplifying circuit 114 determines the sum of the outputs from the split-photodetector 113 to produce a sum signal as an information signal (reproduced data signal), and determines the difference between the outputs of the split photodetector 113 to produce a difference signal as a tracking error signal. The tracking error signal is supplied to a track-traverse counter 118 and a speed-detecting circuit 120.

The track-traversing counter 118 receives the output signal from the addition/subtraction amplifying circuit 114 and detects the number of tracks traversed by the optical head 104. An output of this counter 118 is supplied to a target-velocity generation circuit 119.

The target-velocity generation circuit 119 receives the output signal of the track-traversing counter 118, and, at the time of access, generates a target-velocity signal for the light spot 115. The target-velocity signal is sent to a head-actuator drive control circuit 117.

The head-actuator drive control circuit 117 also receives an output signal from a polarity switching circuit 2. On the basis of these signals, the head actuator drive control circuit 117 controls the drive of a head actuator 116, such as a linear actuator.

When the head actuator 116 is driven through the head-actuator drive control circuit 117 to move the optical head 104 in the radial direction of the optical disk 101.

A speed detection circuit 120 detects the track-traverse speed (the speed with which light spot 115 traverses the tracks on the optical disk 115). The output of the speed detection circuit 120 is fed to the polarity switching circuit 2. The speed detection circuit 120, together with the polarity-switching circuit 2, forms a velocity-detection circuit 124.

The polarity-switching circuit 2 receives an output signal from an access-direction command generation circuit 123. Under the control of the output signal of the access-direction command generation circuit 123, the polarity-switching circuit 2 changes the polarity of the output of the speed detection circuit 120. More specifically, the detected speed (a scalar value) is converted into a detected velocity (a vector value) which also shows the direction.

FIG. 2 is a transfer-function block diagram of the velocity-control system which represents the diagram of FIG. 1. In this drawing, the results of the subtraction between the output signal $V_S^*$ of the velocity detection circuit 124 and the output signal $V_r$ of the target-velocity generation circuit 119 is input to a gain compensation circuit 5. The gain compensation circuit 5 determines the frequency band of the velocity control system.

The gain compensation circuit 5, as well as a notch filter 122 and a head-actuator drive circuit 6, are built into the head-actuator drive control circuit 117. The notch filter 122 compensates the mechanical resonance characteristics $G_L(S)$ of a block 6 in the head actuator 116.

The head-actuator drive circuit 6 is normally of a current drive type, and also contains a drive current detection circuit.

A block 7 in the head actuator 116 represents a force constant of the head actuator 116. The block 8 represents transfer characteristics. Its input is an acceleration, and its output is a head velocity $V_L$ (the velocity with which the optical head 105 is moved by the head actuator 116). M designates the mass of the movable part, $G_L(S)$ designates the mechanical resonance characteristics of the head actuator, and S represents Laplacean. $K_V$ represents the sensitivity in the velocity detection of the target-velocity generation circuit 119 and the velocity-detection circuit 124, and τ represents the track traverse period (period taken for the light spot 115 to traverse a track).

FIG. 3 shows an example of gain characteristic of $G_L(S)$ in the block 8 in FIG. 2 which is shown to have a large resonance peak at a certain frequency $\omega_L$ (usually in the order of kHz). FIG. 4 on the other hand illustrates the gain characteristics $|G_N(S)|$ of the notch filter 122 in FIG. 2. $G_n(S)$ is selected so that:

$$|G_N(S)| \simeq |1/G_L(S)|,$$

when $$\omega_N = \omega_L.$$

FIG. 5 and FIG. 6 show open-loop characteristics of the system of FIG. 2. FIG. 5 shows a case where $G_N(S) = 1/G_L(S)$, while FIG. 6 shows a case where $G_N(S) \neq 1/G_L(S)$.

The system operates in the following manner:

First, the disk drive motor 102 is energized through the disk-drive-motor control circuit 103, and the optical disk 101 shown in FIG. 1 begins to rotate. When the rotation speed reaches a predetermined steady value, the tracking actuator 112 is controlled on the basis of a tracking error signal obtained by the photodetector 113 and addition/subtraction amplifying circuit 114. As a result, the light spot 115 begins to follow the center of a track on the optical disk 101.

At the time of track access, the number of tracks on the optical disk 101, which have been traversed by the light spot 115, is counted by the track-traversing counter 118, and, at the same time, in accordance with the number of tracks to be traversed to reach the target track, the target velocity, which is output from the target-velocity generation circuit 119, and the track-traverse velocity of the light spot 115, which is detected by the velocity-detection circuit 124, are input to the head-actuator drive control circuit 117, which performs a velocity control in which the velocity is reduced to zero as the light spot 115 approaches the target track.

Operation of the velocity control system of FIG. 2 at the time of track access will now be described in detail. A velocity deviation signal Ve, which is the difference between the target-velocity signal $V_r$ from the target-velocity generation circuit 119 and the detected-velocity signal $V_s^*$ from the velocity detector 124, is transmitted to the actuator drive circuit 6 through the gain-compensation circuit 5 and the notch filter 122. As a result, a certain drive current is applied to the head actuator 116. Due to this drive current, the head actuator 116 begins to move the optical head 104, causing the light spot 115 to traverse the tracks on the optical disk 101.

If the track fluctuation velocity, due for example to eccentricity of the optical disk 101, is denoted by Vd, the difference between the velocity of the head actuator 116 and the track fluctuation velocity $V_O$ is detected by the velocity detection circuit 124 as a detected-velocity signal $V_S^*$. This detected-velocity signal $V_S^*$ is fed back in a velocity control system and the control is so made that the detected-velocity signal $V_S^*$ coincides with the target-velocity signal $V_r$.

A loop transfer function (open-loop characteristics) of this velocity-control system from the velocity-deviation signal Ve to the detected-velocity signal $V_S^*$ can be expressed as follows:

$$G_{01}(S) = \frac{V_S^*(S)}{V_e(S)} = \frac{K_C K_A K_F K_V}{MS} \cdot G_N(S) G_L(S) \frac{1 - e^{-S\tau}}{S\tau} \quad (1)$$

If it is so designed that the condition $G_N(S) = 1/G_L(S)$ is satisfied, the head actuator does not have the resonance frequency in the high-frequency zone, as shown in the upper part of FIG. 5. But if $G_N(S) \neq 1/G_L(S)$ because of manufacturing fluctuations between individual devices, the head actuator may have a resonance frequency in the high-frequency band as shown in FIG. 6. When the peak of this resonance exceeds $O_{db}$, the velocity-control system loses its stability.

Moreover, because of a certain dead time of the zero-order hold characteristics of the velocity-detection circuit 124, a long delay in phase is observed in the vicinity of the track-traversing frequency.

Because of the configuration described above, the conventional optical disk drive device had the following problems:

(1) The track traverse velocity is detected based on the track traverse period. When the traverse is made at a low velocity, a time delay (dead time) is lengthened, and the velocity control system loses its stability, and because the cut-off frequency of the velocity-control system must be designed low, the velocity deviation will be increased.

(2) When the light spot 115 traverses drop-out or data address recording portions, such traverse may erroneously be recognized as traverse of tracks, and, in spite of the slow movement of the light spot, the velocity detection circuit 124 erroneously operates as if the track traverse velocity were high. The result is that the velocity control system is disturbed.

(3) The head actuator 116 typically has a high mechanical resonance at the frequency of several kHz. In order to eliminate this phenomenon, a notch filter 122 is built in the head actuator drive-control system. If, however, there are a plurality of resonance frequencies, a plurality of notch filters need to be provided, and the size of the circuit of the system is therefore enlarged. In addition, where there are differences in the resonance frequency from one device to another, and the resonance frequencies differ from the frequencies of the notch filters, and the velocity-control system is not stable.

(4) Because the known system does not detect the direction in which light spot 115 traverses the tracks, but simply assumes that the light spot 115 is traversing the tracks in the direction (toward the inner or outer periphery of the disk) in which the access is to be made and determines the required velocity by changing the polarity of the speed. When the speed is low, and the direction in which the track is traversed is reversed due to track fluctuation or disturbances, a positive feed-back is applied to the system, and the optical disk may behave erratically.

Another problem of the above-described optical disk drive device is described below:

As the above-described optical disk drive device obtains head position control information from the optical disk, the absolute position of the head cannot be reliably detected when operation of the servo-system is disturbed, e. g., in case of application of a large external impact force. In the case, as well as in the case of abnormal operation of the servo-system the head may run out of the proper range toward the center or periphery of the disk and collide with a stopper located at the end of the range of mobility. As a result of this collision, the head receives a blow and can be broken.

The same problem relates to magnetic disk devices, or any other equivalent information storage devices.

Another example of prior art is explained below with reference to FIGS. 7 and 8.

FIG. 7 illustrates a block diagram which shows a control system of a known optical disk drive device published in Papers from the General Meeting of the Institute of Electronics and Communications Engineers (IECE) of Japan, 1985, Vol. 7, pp. 7-76 [1170, "Track Access in a Two-Stage Servo-System", by Hiroshi Inada and Shigeru Shimono]. FIG. 8 illustrates waveforms of control signals used in connection with the device shown in the block diagram. In these drawings, reference numeral 201 designates an optical disk for recording information, or with information already recorded on tracks which are arranged in the form of equally-spaced concentric circles or in the form of a spiral. Reference numeral 202 designates a light beam by means of which information is transferred to and from the optical disk. A head actuator, e.g., a linear actuator 205 drives a carriage 204 of an optical head 203 and moves the carriage 204 with respect to the optical disk 201 and across the tracks. A tracking actuator 206 is installed on the carriage 204 and carries a focusing lens for the formation of a spot of light beam 202 on the tracks of the optical disk 201. The tracking actuator 206 is moved in the same direction as the linear actuator 205 and can cover only a relatively small, predetermined number of tracks. A split photodector 207 which detects the information signal transmitted by the optical beam 202 and converts it into an electrical signal and outputs the electrical signal. A sensor of this detector consists of two parts. Each such part of the sensor produces on its output an electric signal corresponding to the quantity of light of the light beam 202 which is incident on this part.

A subtraction amplifier 211 receives a signal from each sensor part of the split photodetector 207, performs subtraction, and thus detects deviation of light spot of beam 202 from the center of the track on optical disk 201. A velocity detection circuit 212 detects, on the basis of an output signal from the subtraction amplifier 211, the track traverse velocity (the velocity with which the light spot of beam 202 traverses the tracks of optical disk 201 in its movement across the disk). A pulse generation circuit 213 receives signals from the subtraction amplifier 211 and generates a pulse each time the light spot of the beam 202 crosses a track on the disk. A track counter 214 receives a signal corresponding to the track access number N (the number of the tracks that must be traversed to reach the target track from the initial (currently-positioned) track) supplied from outside. The track counter 214 receives pulse signals from the pulse generation circuit 213 and counts down by "1" each time a pulse is applied to it, and its count value is the remaining tracks to be traversed to reach the target track. A reference velocity generation circuit 215 receives from the track counter 214 a signal corresponding to the remaining number of tracks, initially determines the reference velocity pattern corresponding to the number of the remaining track, memorizes this pattern, and then sequentially produces on its output the reference velocity signals corresponding to gradual decrease in the number of remaining tracks counted by the counter 214. A velocity error detector 216 receives a reference velocity signal from the reference velocity generation circuit 215 and a light spot velocity signal from the velocity detection circuit 212, and which detects the difference in velocities. An amplifying circuit 217 amplifies an output signal of the velocity error detection circuit 216 and controls the linear actuator 205. A position control command circuit 218 receives signals from the operational amplifier 211, the velocity control circuit 212, and the track counter 214. When on a predetermined track the velocity of the light spot of beam 202 drops below a predetermined value, the position control command circuit 218 produces a position control command on its output. A tracking servo-circuit 219 receives a position control command from the position control command circuit 218 and thus controls operation of the tracking actuator 206.

The above-described conventional optical disk drive device operates as follows: Track-access control is comprised of a velocity control mode and a position control mode. In the velocity control mode, the carriage 204 is driven by the linear actuator 205, to cause movement of the light spot in the direction of traverse of the tracks of the optical disk 201. In the position control mode, after the velocity of the light spot of the light beam 202 has been reduced below a predetermined velocity at the predetermined track, the tracking actuator 206 is controlled and the light spot is stopped at the position where the spot coincides with the center of a track on the disk 201 (FIGS. 8A-8C). First, in the velocity control mode, a signal which corresponds to track access number supplied from outside (number N in FIG. 7) is sent to the track counter 214. Because at the very beginning there are no pulses from the pulse generation circuit 213, so the number of the remaining tracks is left unchanged and the generated signal corresponds to this particular number N. Receiving this signal, the reference velocity generation circuit 215 initially determines the reference velocity pattern (FIG. 8A), and then sequentially outputs reference velocity signals in accordance with the number of remaining tracks as counted by the track counter 214. The reference velocity signal and the light spot velocity signal, which is produced by the velocity detection circuit 212, are input to the velocity error detection circuit 216 where both signals (i.e., of detected and reference velocities) are compared. The difference is amplified by the amplifier 217, and the amplified signal is used to control the velocity of the linear actuator 205. In accordance with the reference velocity pattern, the linear actuator 205 makes acceleration up to a predetermined number of tracks, the velocity is then stabilized until a predetermined number of tracks is reached, when the deceleration is made.

In this way, the light spot of beam 202 moves across the optical disk to reach the target track. When the light spot of beam 202 traverses a track, the quantity of light reflected from the optical disk 1 will change. As the sensor of photodetector 207 consists of two parts, the quantity of light reflected onto each sensor part also will vary. The light reflected onto the sensor is converted to electrical signals which correspond to the amount of light received by the sensor and which are output from the sensor parts. The output signals from the sensor parts are input to the subtraction amplifier 211 performs subtraction to produce a difference signal as shown in FIG. 8D. In this difference signal waveform, a zero point of each cycle corresponds to the moment when the center of the track on optical disk 1 coincides with the center of the light spot of beam 202. The velocity detection circuit 212 receives the output difference signals from the subtraction amplifier 211 and detects on the basis of these signals the track traverse velocity. The pulse generation circuit 213 generates pulses, for example, at the moment of each cycle when the difference signal waveform of the output from the subtraction amplifier 211 passes through zero. Each such pulse is used as a signal indicating that the light spot of beam 202 crossed the track. The pulses are supplied to the track counter 214. The position control command circuit 218 receives output signals of the subtraction amplifier 211, the velocity detection circuit 212, and the track counter 214. If at the moment of arrival of the light spot at a position with a predetermined number of tracks to the target track, e.g., one track to the target one, the velocity is below a predetermined value, the position control command circuit 218 will issue an output command which will switch the system to the position control mode.

In the position control mode, the tracking servo-circuit 219 receives the output signals of the position control command circuit 218 and the subtraction amplifier 211, and controls the tracking actuator 206 referring to the phase of the difference signal waveform from the subtraction amplifier 211. When the center of the target track of the optical disk 201 coincides with the center of the light spot of beam 202, the tracking actuator stops. Thus, pull-in into the track is completed. The light spot of beam 202 follows the target track, and recording and reproduction of information is conducted.

In the known optical disk drive device of the type described above, the carriage 204 is driven by the linear actuator 205, and when the target track is reached and operation of the linear actuator 205 and tracking actuator 206 is switched from the velocity control mode to the tracking control mode, the detected speed may be disturbed either by defects in optical disk 201, or by sudden deviation in the actual velocity due for example to external forces. As a result, the pull-in by the tracking servo-circuit 219 may not be achieved. In such a case, the system may behave erratically, unless an external position or velocity scale is provided.

SUMMARY OF THE INVENTION

It is an object of the present invention to compensate the dead time of the velocity-detection circuit, increase the stability of operation of the velocity-control system, widen the operating frequency-band of the system, reduce deviation in the velocity, decrease disturbances of the velocity-control system caused by erroneous operation of the velocity-detection circuit at the moment of passage over drop-out and address data portions of the disk, eliminate the notch filter thereby simplifying the circuit, and suppress the influence of the mechanical resonance at any frequency.

Another object of the invention is to protect the optical head from behaving erratically, even when the track traverse direction is reversed due to disturbances or track fluctuations.

Another object of the present invention is to provide such an information storage device, which protects the head from "run-out" under any extraordinary circumstances, protects the head from collision and breakage, and provides stable operation at the starting period.

Another object of the present invention is to provide such an information storage device for recording, reproducing, and erasing information on or from the information storage medium, which does not require an external scale (which some conventional system employ) and which is capable of avoiding erratic behavior in the event of an off track (departure from the target track) which may occur during tracking mode due for example to external forces, and which is capable of returning the light spot to the area in the vicinity of the target track and of continuing its operation in the tracking mode.

An optical disk drive device according to the invention comprises:

an optical head which forms a light spot on an optical disk with multiple tracks, said optical head including an photodetector which receives light reflected from said tracks and provides a photoelectric conversion signal, and a movable part including a lens for focusing said light spot on said optical disk;

a head actuator which is connected to said optical head and which, when said optical head accesses said tracks of said optical disk, moves said movable part in a radial direction of said optical disk;

a motion detection means which is connected to said optical head, and which receives said photoelectric conversion signal produced by said photodetector and produces as output a track-traverse motion signal representing the track-traverse motion of said light spot;

an acceleration detecting means for detecting the acceleration of said head actuator and producing an output signal representative thereof;

a target velocity generating means connected to said acceleration detection means for generating a track-traversing target velocity determined by the output of acceleration detecting means and said photoelectric conversion signal;

a state-observer means which is connected to said acceleration detecting means and said motion detecting means, and which receives as input the output signals from said acceleration detecting means and said motion detecting means, and produces as output an estimated track-traverse velocity of said light spot; and a head actuator drive circuit connected to said target velocity generation means and said state-observer means for controlling said head actuator such that the estimated velocity coincides with said target velocity.

According to a further aspect of the invention, there is provided an information storage device having a head which can move with respect to an information-storing medium and write, read, or erase this information. The device is provided with a head position detector which detects the position of the head between the limits of the user utilizable region of said information storing medium and limits of mobility of said head, and operates so that when the head exceeds the above-mentioned limits of the user utilizable region, or receives a stop command, the head is moved to a position associated with the above-mentioned detector.

When for any reason the head runs out of its proper range, it will exceed the limits of the user utilizable region and reach the position of the head detector. The latter detects the head, moves it to a position associated with the detector, and thus protects the head from reaching the limits of its mobility, and hence, from collision with the stopper.

According to a further aspect of the invention, there is provided an information storage device which comprises: a head for recording, reproducing, and erasing the information on or from the information storage medium, head drive means for driving a movable portion of the head in a track-traverse direction; tracking control means which allows the tip of the head to follow the center of the track; off-track detection means; and means for controlling the velocity with which the tip of the head traverses the tracks.

When an off-track (departure of the light spot from the target track) occurs during tracking control, this is detected, and the tracking control is interrupted, the track traverse velocity is controlled, and when the track traverse velocity is reduced below a value at which pull-in into the tracking is possible, the tracking control is resumed.

DETAILED DESCRIPTION OF THE EMBODIMENTS

Figure 1:
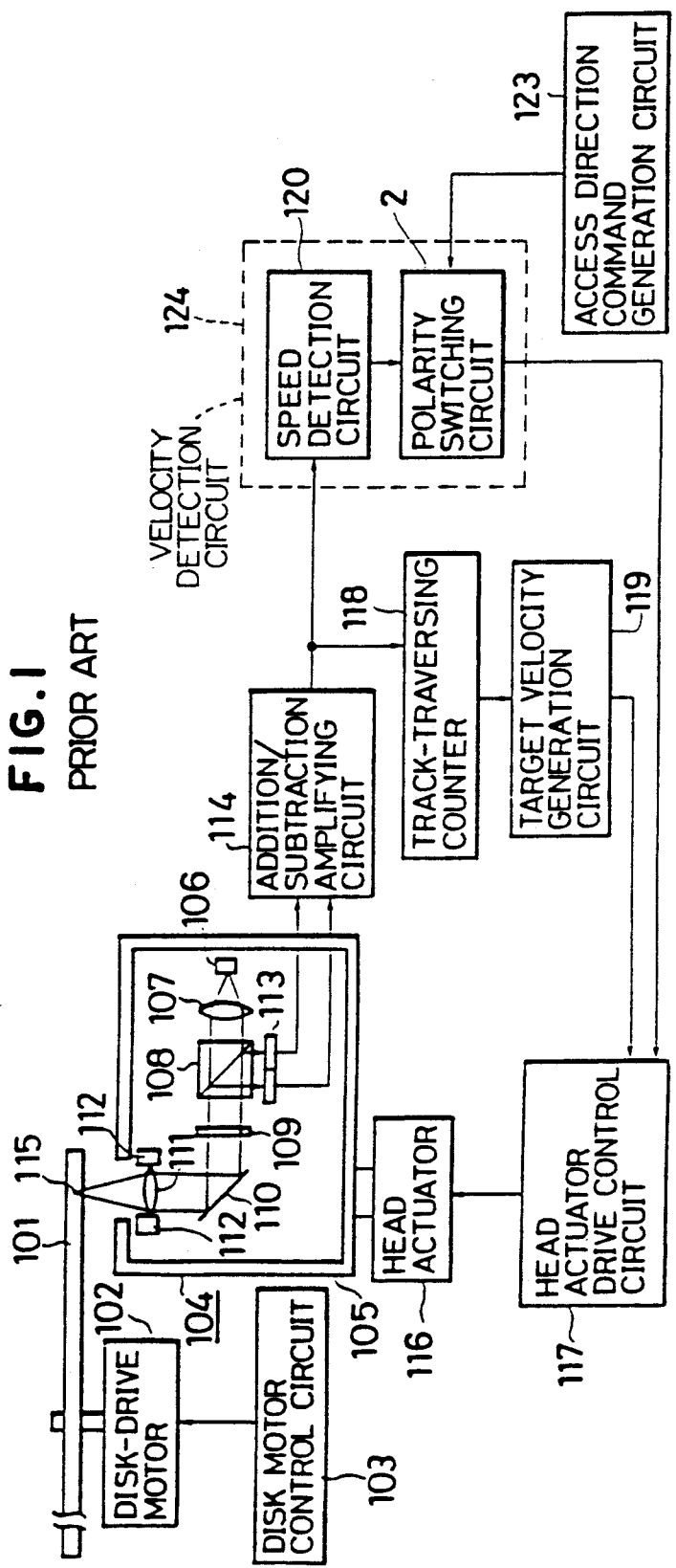
FIG. 1 a block diagram of a known optical disk drive device.
Figure 9:
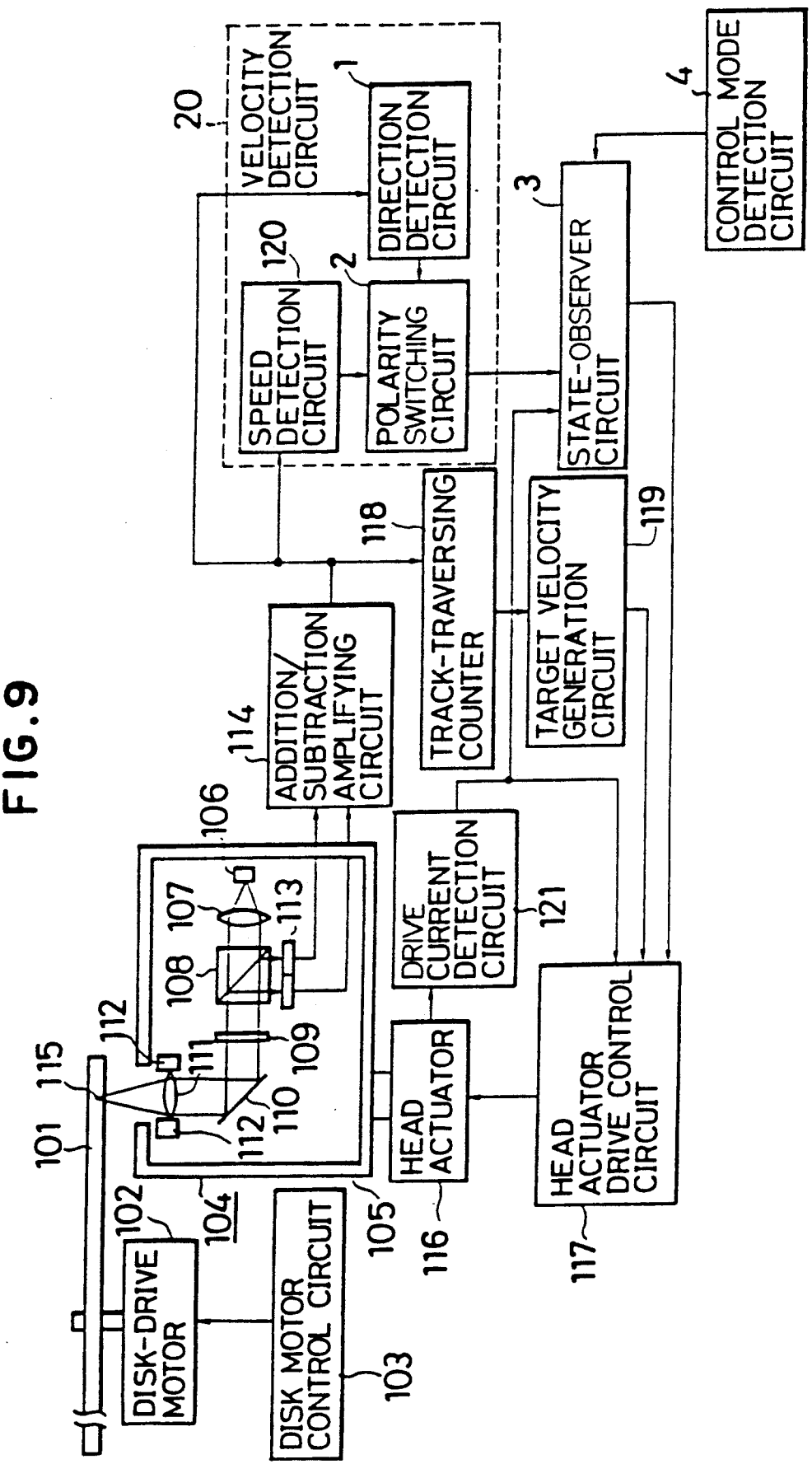
FIG. 9 is a block diagram of the optical disk drive device of an embodiment of the invention.

FIG. 9 shows a block diagram of a system of an embodiment of the present invention. In this drawing, reference numerals 10 to 120 designate identical or corresponding elements in the conventional system shown in FIG. 1, and their description is omitted in order to avoid duplication of explanation, and the following explanation is concentrated mainly on elements which are different from those shown in FIG. 1.

A direction-detection circuit 1 receives the difference signal and the sum signal from the addition/subtraction amplifying circuit 114. On the basis of these signals, the direction detection circuit 1 detects the track traverse direction (direction with which the light spot 115 traverses the tracks). Responsive to an output signal from the direction-detection circuit 1, a polarity switching circuit 2 determines or switches the polarity of an output of the speed-detection circuit 120. A velocity-detection circuit 20 is composed of the direction-detection circuit 1, the speed-detection circuit 120, and the polarity switching circuit 2.

A state-observer unit 3 receives the drive current signal detected by the drive current detection circuit 121, which detects the drive current of a head actuator 116, and a velocity-detection signal which has a polarity appended at the polarity switching circuit 2. On the basis of the above signals, the state-observer unit 3 presumes or estimates the velocity which is closer to the true value. An output signal from the state-observer unit 3 is sent to the head-actuator drive control circuit 117.

When a light spot 115 moves along the center of the track, a control-mode detection circuit 4 generates a command which resets an integrator 12 in the state-observer circuit 3.

Figure 8:
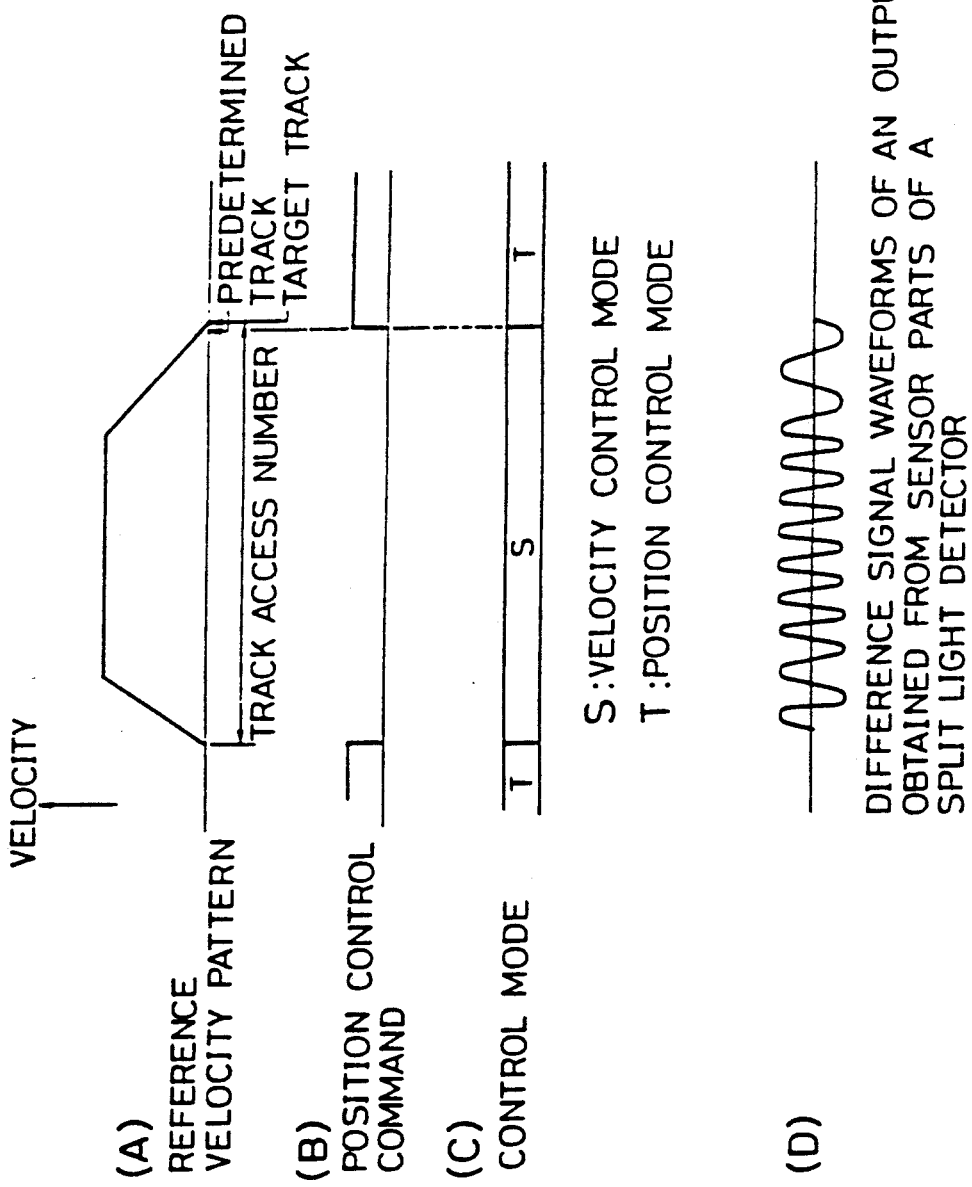
FIGS. 8(a–d) shows waveforms explaining operation of the known device of FIG. 7.
Figure 10:
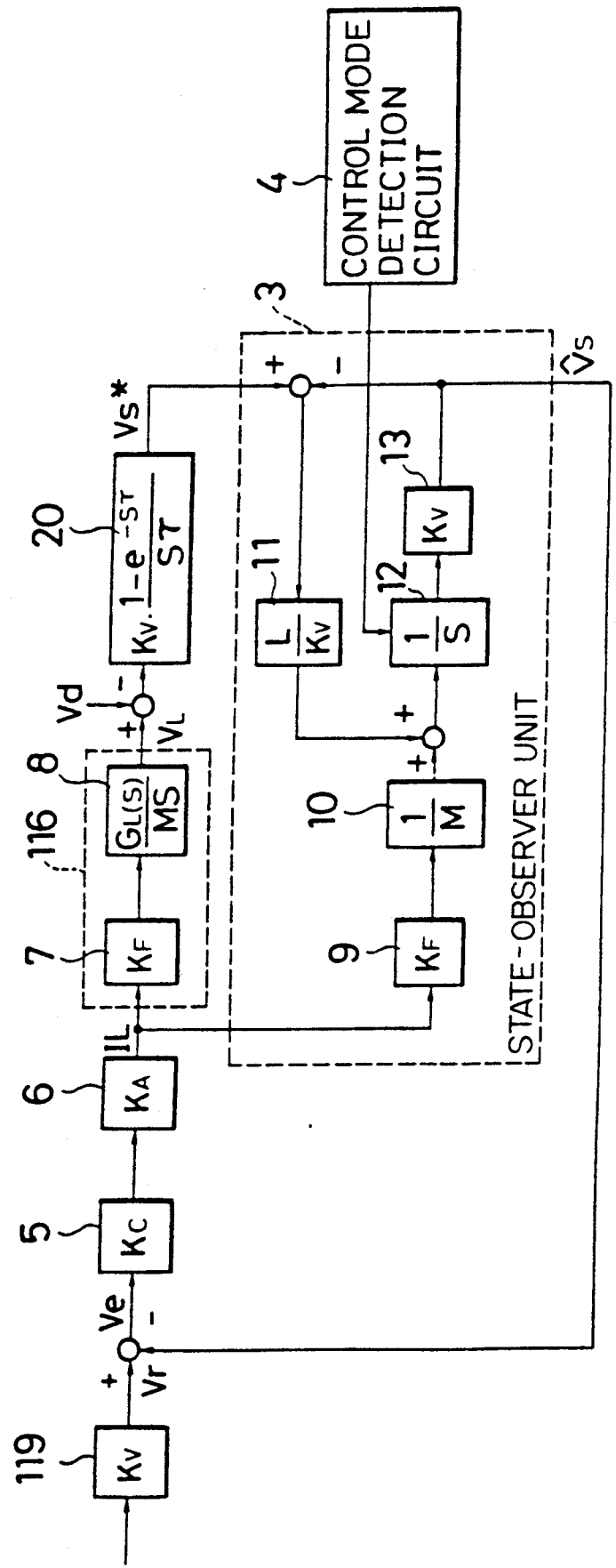
FIG. 10 is a block diagram of the velocity-control system incorporated in the optical disk drive device.

FIG. 10 is a transfer-function block diagram showing the velocity-control system of FIG. 9. In this drawing, the state-observer unit 3, the control-mode detection circuit 4, and the velocity-detection circuit 20 correspond to those of FIG. 9. In addition, a gain-compensation circuit 5, a force constant 7 of the head actuator, and block 8 are the same as those in FIG. 8.

The state-observer unit 3 is comprised of gain elements 9, 10 and 13, a feedback gain element 11, an integrator 12, a subtractor 14 and an adder 15.

The gain element 9 has a gain $K_F$ equivalent to the force constant 7 of the head actuator 116, receives the drive current which is detected in the head actuator drive circuit 6, and outputs an estimated value of the drive force. The gain element 10 has a gain $1/M$ which is the reciprocal of the mass of the movable parts of the head actuator 116 and the optical head 104 which are movable at the time of access. The output of the gain element is an estimated value of acceleration of the head. The subtractor 14 determines the difference between the detected velocity $V_S^*$ from the velocity detection circuit 20 and the output of the gain element 13, which is the estimated track traverse velocity $\hat{V}_S$, as will be apparent from the subsequent description. The feedback gain element 11 receives the output of the subtractor 14. The adder 15 determines the sum of the estimated acceleration from the gain element 10 and the output of the feedback gain element 11. The integrator 12 integrates the sum as output from the adder 15. The integrator 12 is reset by an output from the control-mode detection circuit 4. The gain element 13 simulates the velocity-detection circuit 20 and its output is the estimated velocity signal $\hat{V}_S$.

Of the above described elements, the gain elements 9 and 10 in combination form a means for simulating the blocks 7 and 8, i.e., nominal characteristics of the head actuator 116. The output of the gain element 10 is a simulation of the acceleration of the optical head. The feedback gain element 11, the integrator 12, the gain element 13, the subtractor 14 and the adder 15 in combination form a means for combining the output of the simulating means (9 and 10), and the detected velocity $V^*$. Simply stated, its output, which is the estimated velocity, is given as the sum of the detected-velocity $V_S^*$ (which is updated each time traverse of a track is detected) and an estimated head velocity (as obtained by the simulation by the use of the gain elements 9 and 10 and the subsequent integration by the integrator 12). For low frequency components, the detected-velocity $V_S^*$ is dominant, i.e., $\hat{V}_S \simeq V_S^*$. For high frequency components, the estimated value of the head velocity is dominant, i.e., $\hat{V}_S \simeq \hat{V}_L$. This will be later described in further detail.

Figure 11:
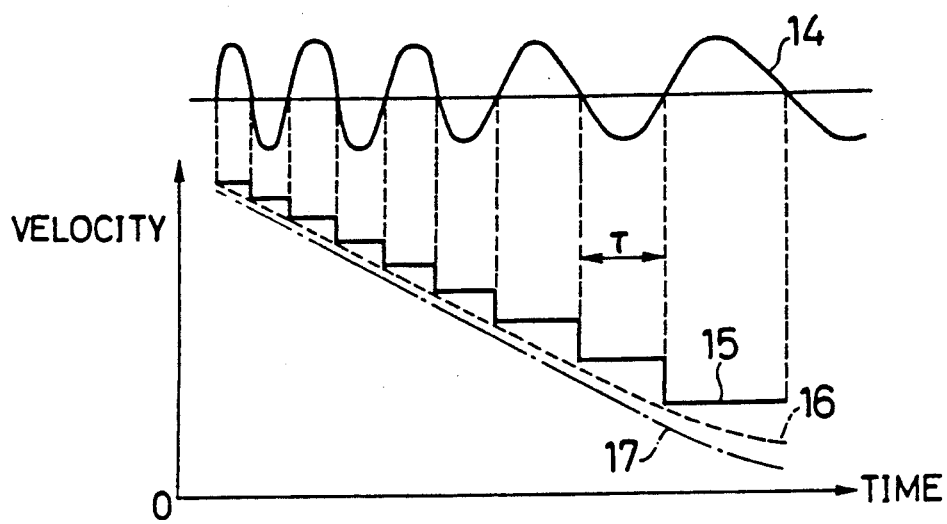
FIG. 11 is a diagram which explains the operation of the state-observer unit in the optical disk drive device.

FIG. 11 shows waveforms of signals appearing at various parts of the velocity-control system. Reference numeral 14 designates a track-traversing sensor signal obtained from the output of addition/subtraction amplifying circuit 114 of FIG. 9. Reference numeral 15 designates an output signal (detected velocity signal) $V_S^*$ of the velocity-detection circuit 20. Reference numeral 16 designates an estimated velocity signal $\hat{V}_S$ at the output of state-observer unit 3. Reference numeral 17 designates an estimated velocity signal $\hat{V}_S$ which appears on the output of the state-observer unit 3, in the case when the gain of feedback gain element of FIG. 10 is equal to zero (L=0).

Figure 12:
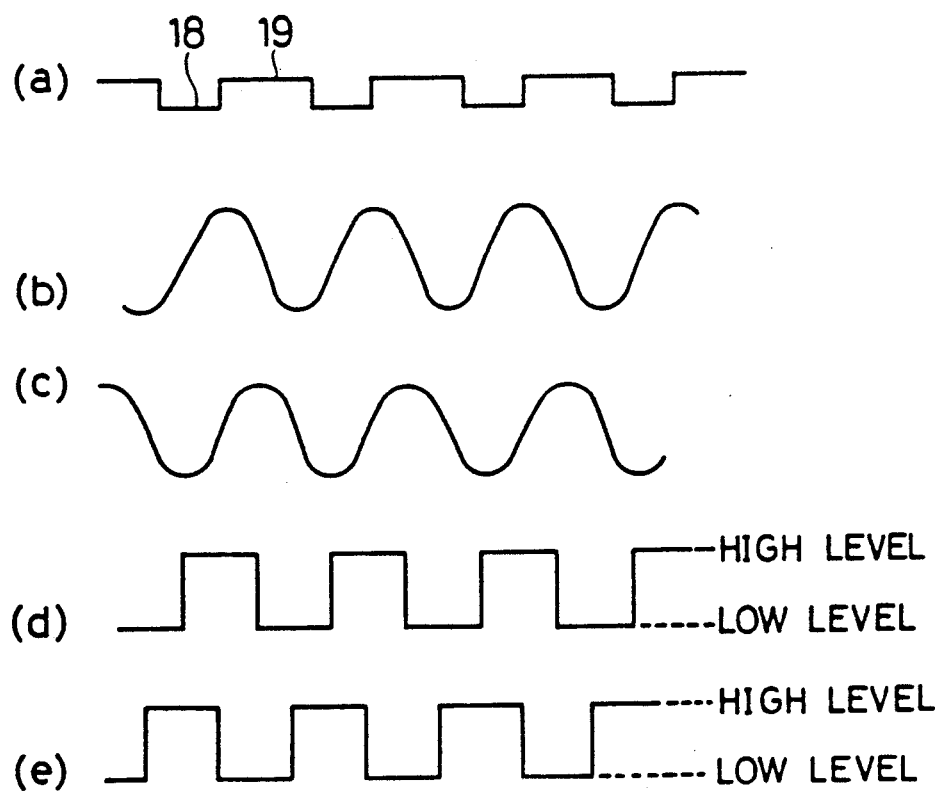
FIGS. 12(a–e) are diagrams which explain the operation of the direction-detection circuit of the optical disk drive device.

FIG. 12 shows the relationship between track grooves and the detected signals. FIG. 12(a) is a cross-sectional view of an optical disk. In this drawing, reference numeral 18 designates a groove portion and 19 designates portion between the grooves. FIG. 12(b) shows a difference signal (tracking error signal) from the addition/subtraction amplifying circuit 114 of FIG. 9. FIG. 12(c) illustrates a sum signal (information signal) from the addition/subtraction amplifying circuit 114. FIGS. 12(d) and (e) are respective comparator signals (which are obtained by digitizing the analog signals shown in FIG. 12(b) and 12(c) into binary signals.

Figure 13:
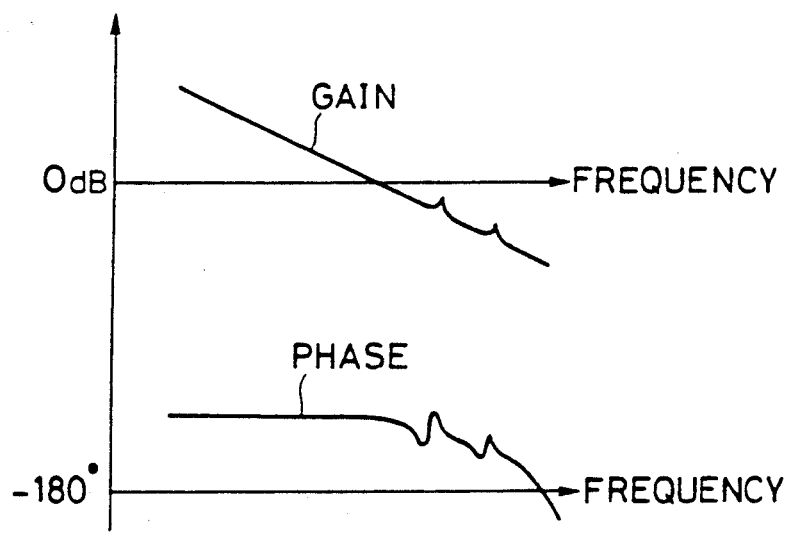
FIG. 13 is an example of an open-loop transfer characteristic of the velocity-control system of FIG. 10.

FIG. 13 shows respective open-loop transfer characteristics of the control system shown in FIG. 10, representing the frequency characteristics of the gain and phase.

In the optical disk drive device as described above, light which is emitted from a light source 106 is collimated by the collimator lens 107, passes through a polarization beam splitter 108 so that the light emitted therefrom is linearly polarized, passes through a λ/4 plate, is reflected by a mirror 110, and is then converged by an objective lens 111 into a light spot 115 on the surface of the optical disk 101 rotating at a steady speed.

The light reflected from the optical disk 101 passes through the objective lens 111, is reflected at the polarization beam splitter 108, and is sent to a split-photodetector 113.

The light received by the split-photodetector unit 113 is photo-electrically converted by the split-photodetector 113 into electrical signals. In the addition/subtraction amplifying circuit 114, the electrical signals from the split-photodetector 113 are added and subtracted to form the sum signal (information signal) and the difference signal (tracking-error signal).

At the time of access, the sum signal and tracking error signal are sent to the inputs of the track-traversing counter 118, the speed-detection circuit 120, and the direction-detection circuit 1.

As the direction-detection circuit 1 detects the track-traverse direction, i.e., whether the light spot 115 is moved outward (toward the periphery of the disk) or inward (toward the center of the disk), the polarity is determined or switched in the polarity switching circuit 2. After the switching of the polarity, the signal is supplied as a detected velocity signal to the input of the state-observer unit 3. Simultaneously, the drive current signal of the head actuator 116 which is detected by the drive current detection circuit 121 is also input to the state-observer unit 3.

Furthermore, at this moment, an output signal of the control-mode detection circuit 4 clears the reset of the integrator 12 in the state-observer unit 3, so that the state-observer unit 3 is activated.

Meanwhile, an output signal of track-traversing counter 118 is transmitted to the target-velocity generation circuit 119 and the output of the target-velocity-speed generation circuit 119 forms a signal which corresponds to the target velocity related to the number of the remaining tracks (tracks to be traversed to reach the target track).

The head-actuator drive control circuit 117 receives the output signals from the target-velocity generation circuit 119, the state-observer unit 3, and the drive current detection circuit 121. On the basis of these signals, the head-actuator drive control circuit 117 controls the operation of the head actuator 116, and hence, the track traverse velocity.

Operation of the state-observer unit 3 will now be described with reference to FIGS. 10 and 11. An output signal of the gain-compensation circuit 5, which determines the frequency-band, i.e., the operating range of the velocity-control system, comprises the drive command signal of the head actuator 116. This signal is converted into a drive current in the head-actuator drive circuit 6, which produces a drive force by multiplication with a force constant $K_F[N/A]$ in the head actuator 116 into force constant. The drive force in turn produces an acceleration by multiplication with a factor 1/M which is the reciprocal of the mass. The acceleration is integrated and affected, in the high-frequency band, by the resonance characteristics $G_L(S)$ of the head actuator 116. As a result, the head actuator 116 is moved at a head velocity $V_L$.

Due to eccentricity of the optical disk 101, for example, the tracks may fluctuate with respect to a stationary structure, such as a frame of the optical disk drive device, not illustrated as such. In such a case, the track traverse velocity is then equal to the difference between the head velocity $V_L$ and the track fluctuation velocity Vd (the velocity with which the track fluctuates). This velocity is detected in the velocity-detection circuit 20, and is converted into an electrical signal by multiplication with a gain which comprises a velocity-detection sensitivity $K_v$[Vm/s].

Figure 6:
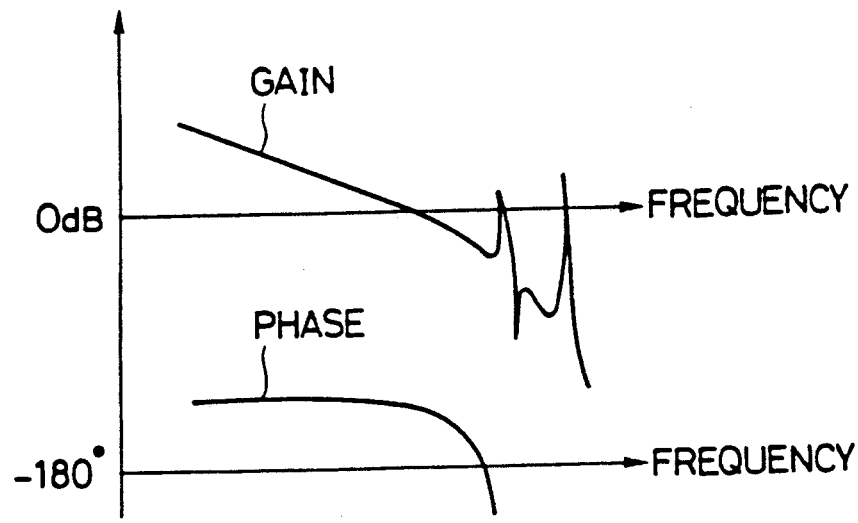

The detected-velocity signal 15, which is obtained by detection from the tracking periods of the track-traversing sensor signal 14, which comprises an output of the addition/subtraction amplifying circuit 114 (FIG. 11), is not obtained until track traverse is first detected, and is thereafter obtained as an average velocity of traverse over the preceding half-track. During deceleration, the detected-velocity signal 15 is in the form of steps as illustrated. It thus has a zero-order hold characteristics shown in the speed detection circuit 120 (FIG. 6). As the velocity is lowered, the track traverse period $\tau$ is longer.

The state-observer unit 3 comprises an electronic circuit which simulates the nominal transfer characteristics of the head actuator 116 and the velocity-detection circuit 20, i.e., transfer characteristics disregarding the high-frequency band resonance characteristic $G_L(S)$ of the head actuator 116 and the zero-order hold characteristic $(1-e^{-S\tau})/S\tau$ of the velocity-detection circuit 20.

In the state-observer unit 3, the drive current signal $I_L$ of the head actuator 116, which is detected in the drive current detection circuit 6, is converted through the gain elements 9 and 10 into the acceleration information. The adder 15 adds the acceleration information from the gain element 10 to the output of the feedback gain element 11, and the sum is passed through the integrator 12 and then the gain element 13 with a gain $K_V$. The output of the gain element 13 represents the estimated velocity signal $\hat{V}_S$.

The subtractor 14 determines the difference between the estimated velocity $\hat{V}_S$ and the detected-velocity $V_S{}^*$. This difference is multiplied with $L/K_V$ in the feedback gain element 11, and is added to the output of the gain element 10 at the adder 15. The sum is input to the integrator 12, as described before. In this way, the difference between the estimated velocity signal $V_S$ and the detected velocity signal $V_S{}^*$ is multiplied with a gain $L/K_V$ and added to the acceleration signal, and the sum is input to the integrator 12, thus the estimated velocity $\hat{V}_S$ and the detected-velocity $V_S{}^*$ converge toward each other (i.e., approaches each other).

The transfer function from the two input signals to the state-observer unit 3, i.e., the drive current signal $I_L$ and the detected-velocity signal $V_S{}^*$ to the estimated velocity $V_S$ on the output of the state-observer unit 3, can be expressed as follows:

$$V_S = 1/(S+L) \cdot K_F K_V / M \cdot I_L + 1/(S+L) \cdot V_S{}^* \quad (2)$$

More specifically, the transfer function from the drive current signal $I_L$ and to the estimated-velocity signal $V_S$, and the transfer function from the detected-velocity signal $V_S{}^*$ to the estimated-velocity signal $V_S$, are both of a first-order delay, and their time constant is equal to $1/L$, so the state-observer unit 3 is stable as long as $L>0$. The value L is a parameter which determines the rate of convergence of the estimated velocity signal $V_S$. For example, if converging is to be achieved with the time constant equal to 1 ms, L is selected equal to $10^3$.

The significance of the formula (2) will now be considered for each of the respective frequency-bands. First of all, because $K_F I_L/M$ corresponds to the acceleration of the optical head 104, the following relation holds (if we neglect the terms one or more orders smaller) when the track fluctuation velocity Vd is sufficiently lower than the velocity $V_L$ of the optical head 104:

$$|V_S{}^*| \sim |1/S \cdot K_F K_V / M \cdot I_L| \quad (3)$$

Substituting $S = j\omega$, the following relations hold.
(i) When $\omega << L(|S| << L)$:

$$V_S \sim 1/L \cdot K_F K_V / M \cdot I_L + V_S{}^* \quad (4)$$

If $L \sim 1000$, from the formula (3) one can obtain the following:

$$|V_S{}^*| \sim |1/S \cdot K_F K_V / M \cdot I_L| > |1/L \cdot K_F K_V / M \cdot I_L| \quad (5)$$

Therefore $$V_S \sim V_S{}^* \quad (6)$$

(ii) When $\omega >> L(|S| >> L)$, the following relation holds.

$$V_S \sim 1/S \cdot K_F K_V / M \cdot I_L + L/S \cdot V_S{}^* \quad (7)$$

From formula (3), the following is derived:

$$|L/S \cdot V_S{}^*| << |V_S{}^*| \sim |1/S \cdot K_F K_V / M \cdot I_L| \quad (8)$$

Therefore, $$V_S \sim 1/S \cdot K_F K_V / M \cdot I_L \quad (9)$$

is obtained.

It is seen from the formulae (6) and (9), that the estimated track-traverse velocity signal $V_S$ is equal to the detected velocity signal $V_S{}^*$ in the low-frequency band, while in the high-frequency band, it is equal to an integral of the head-actuator drive current $I_L$. The break point (the boundary between the region in which the estimated track-traverse velocity signal $V_S$ is equal (or about equal) to the detected velocity signal $V_S{}^*$ and the region in which the estimated velocity signal $V_S$ is equal (or about equal) to an integral of the head-actuator drive current $I_L$) is a frequency L [rad/sec] which coincides with the frequency band of the state-observer unit 3. If, for example, $L = \infty$, the formula (2) will be transformed into the following:

$$V_S = V_S{}^* \quad (10)$$

Figure 2:
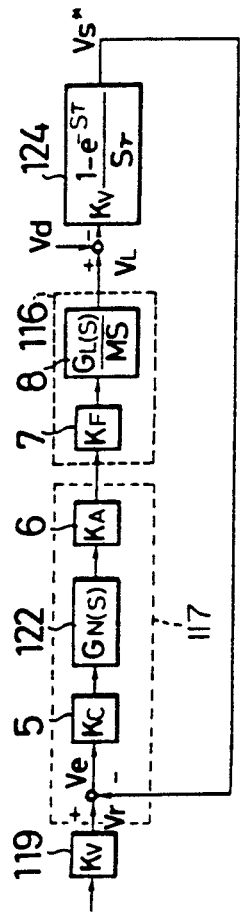
FIG. 2 is a block diagram of the velocity-control system used in the known optical disk drive device.

The velocity-control system is then identical to a conventional one which is shown in FIG. 2 and does not have a state-observer unit. The time response of such a system, $V_S$, coincides with the output signal 15 of FIG. 13, so it is impossible to compensate for the dead time which occurs in the velocity-detection circuit 20. If, on the contrary, L is equal to 0, then the formula (2) will be transformed into the following expression:

$$V_S = 1/S \cdot K_F K_V / M \cdot I_L \quad (11)$$

Thus, in this case, the time response of the estimated velocity signal $V_S$ coincides with the estimated velocity signal 17 in FIG. 11, and is not affected by the dead time of the velocity detection circuit 120, and the high-frequency band resonance characteristics of head actuator 116. However, even a slightest offset superimposed on the drive current $I_L$ will increase the error in the estimated velocity $V_S$.

Moreover, the estimated velocity signal $V_S$ does not contain the track fluctuation velocity Vd at all. So, the estimated velocity $V_S$ is an estimated value for the head velocity $V_L$, rather than the track traverse velocity. When the speed of movement of the head is low, and the head velocity $V_L$ is so low that the track fluctuation velocity Vd cannot be ignored, the error in the estimated velocity signal $V_S$ (estimated value) of the track traverse velocity is large.

Thus, by setting the gain L of the feedback gain element 11 to be sufficiently lower than the high-band resonance frequency of the head actuator 116, and the track traverse frequency (the frequency with which the light spot 115 traverses the tracks), and sufficiently higher than the track fluctuation fundamental frequency, the time response of the estimated velocity signal $V_S$ can be made as shown by the broken line 16 in FIG. 11, which is intermediate between the output signals 15 and 17. Thus, the dead time of the velocity detection circuit 120 can be compensated for to a certain extent.

Because on the basis of formula (2), the transfer characteristic from the detected-velocity signal $V_S^*$ to the estimated velocity signal $V_S$ can be represented by the characteristic of a first-order low-pass filter represented by $1/(1+S/L)$, the estimated velocity signal $V_S$ will not be disturbed substantially, even when the output signal (i.e., the detected-velocity signal) $V_S^*$ is disturbed, e.g., under the effect of recording pits or drop-outs on the optical disk 101.

In addition, by the arrangement in which, during tracking of a track by the light spot 115, the integrator 12 is reset by a command from the control-mode detection circuit 4, and this reset is cleared simultaneously with the switching to the velocity-control mode, since the track-traverse velocity during the tracking is certainly equal to zero, the initial value of the estimated-velocity output signal from the state-observer unit 3 immediately after the switching to the velocity-control mode will not include any error. Moreover, even if an error is present, it will be converged to zero with the time constant 1/L.

The open-loop transfer function of the velocity-control system of FIG. 10 can be calculated as follows:

$$G_{02}(S) = K_C K_A K_F K_V/MS \cdot (S + LG_L(S) \cdot \quad (12)$$
$$(1 - e^{-S\tau}))/S\tau/(S + L)$$
$$= K_C K_A K_F K_V/MS \cdot$$
$$(1 + L/S \, G_L(S)(1 - e^{-S\tau}))/S\tau/(1 + L/S)$$

If $\omega_L$ designates the frequency at which the high-band resonance characteristic $G_L(S)$ of the head actuator 116 has a peak, then by setting the value of L so that $L << \omega_L$ is satisfied, the following relationship holds:

$$|L/S.G_L(S)|_{S=j\omega_L} = L/\omega_L |G_L(j\omega_L)| \quad (13)$$

Therefore, the influence which is exerted by the value of the high-band resonance peaks of the head actuator 116 on the open-loop characteristic of formula (12) will be suppressed to $L/\omega_L$ times ($L/\omega_L << 1$), and the high-band resonance peaks of the gain characteristics are as shown in FIG. 13, and are smaller than those shown in FIG. 6.

Figure 3:
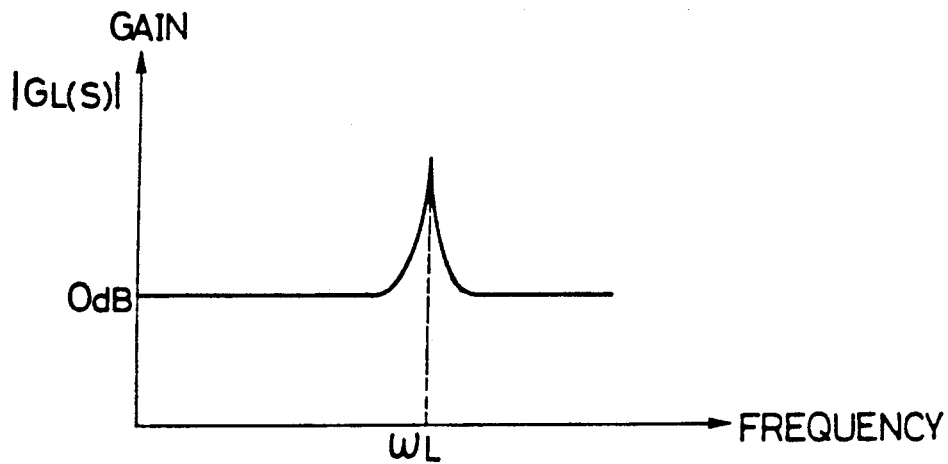
FIG. 3 shows high-frequency-band resonance frequency characteristics of the mechanical system.

It is also different from the frequency characteristic of a notch filter 122 shown in FIG. 3 in that the high-band resonance frequency $\omega_L$ will not be required to be a specific value. That is, if the frequency satisfies condition $\omega_L >> L$, the suppression effect will be obtained at an arbitrary frequency, and even there are a plurality of peaks they are suppressed uniformly. Similar to mechanical resonance characteristic $G_L(S)$, the phase delay and the gain reduction due to the zero-order hold characteristic of the velocity-detection circuit 20 in the formula (12), are also alleviated, and the phase of the open-loop characteristics extends to the high-frequency band, and the stability of the system is improved.

When the light spot 115 traverses the grooves of the tracks as shown in FIG. 12(a), the difference signal (FIG. 12(b)) and the sum signal (FIG. 12(c)) from the addition/subtraction amplifier 114 are 90° shifted relative to each other. Utilizing this fact, it is possible to determine the direction of movement of the light spot, i.e., whether it is moving from the left to the right in FIG. 12(a), or from the right to the left in FIG. 12(a). That is, if the level of the signal in FIG. 12(e) is high when the signal in FIG. 12(d) rises, or if the level of the signal in FIG. 12(e) is low when the signal in FIG. 12(d) falls, the light spot is moving from the left to the right. If, on the contrary, the level of the signal in FIG. 12(e) is low when the signal in FIG. 12(d) rises, or if the level of the signal in FIG. 12(e) is high when the signal in FIG. 12(d) falls, the light spot is moving from the right to the left.

If, in the manner described above, the track traverse direction (the direction in which the light spot 115 traverses the tracks) is detected by the direction-detection circuit 1, and the polarity of the output signal of the speed-detection circuit 120 is switched depending on the track-traversing direction, positive feedback is voided and the operation of the velocity-control system will be stable.

Figure 14:
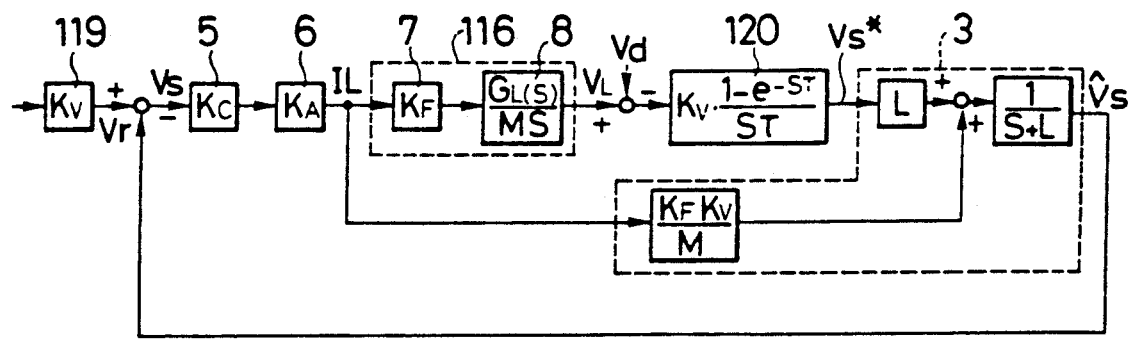
FIG. 14 is a block diagram of a velocity-control system of the optical disk drive system of another embodiment of the invention.

Another embodiment of the invention is shown in FIG. 14 which is a block diagram similar to FIG. 10. In this system, the state-observer unit 3 is slightly modified from the state-observer unit 3 in FIG. 10. The transfer function from the detected velocity signal $V_S^*$ and the drive current signal $I_L$ to the estimated velocity signal $V_S$, as well as the open-loop transfer function, are also as represented by formulae (2) and (12).

Moreover, although the system shown in FIG. 9 has a polarity switching circuit 2 installed directly after the speed-detection circuit 120, what is essential is that the polarity be switched so that the control system has a negative feedback, so that the polarity switching circuit 2 may alternatively be provided directly after the drive-current detection circuit 121 or after the state-observer unit 3.

Furthermore, in the embodiment described above, the track traverse speed and the track traverse direction are detected on the basis of the signals obtained by determining the sum and the difference on the split-photodetector outputs. But they may obtained in other ways. For example, when a sample servo system using an optical disk without track grooves is employed, the track traverse speed and the track traverse direction may be detected on the basis of an output of the tracking signal (tracking error signal) detection means or an output of a track traverse number detection means and an output of a means for detecting a signal corresponding to the reflected-light total-amount signal.

Furthermore, they may be detected from the address information or the like of the optical disk.

Figure 15:
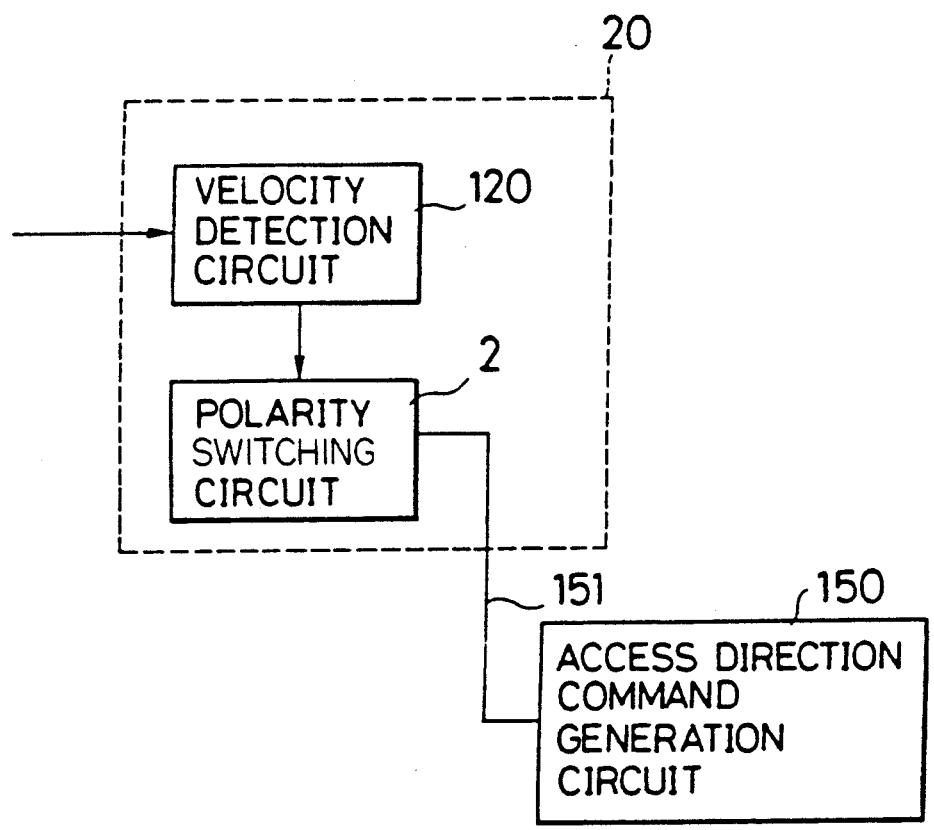
FIG. 15 is a diagram showing a modification of the optical disk drive system of FIG. 9.

In the illustrated embodiments, the polarity of the output signal from speed-detection circuit 120 was switched or determined on the basis of the direction detected in the direction-detection circuit. If, however, the track traverse direction is not reverted during velocity control, or if the time for which the track traverse direction is opposite is short, the estimated velocity signal $V_S$ can be determined from the drive current signal $I_L$ alone, by means of formula (9). Therefore, the velocity-control system will never have a positive feedback. Accordingly, as shown in FIG. 15, the polarity of the output signal from the speed-detection circuit 120 may be switched at a polarity-switching circuit 2 on the basis of the access-direction command 151 supplied from an access-direction command generator 150, before being supplied to the state-observer unit 3.

In the embodiment of FIG. 10, the head actuator was a linear actuator. The head actuator may alternatively be a rotary-type actuator. In this case, the mass M of the movable parts described with reference to FIGS. 10, 11 and 12 should be replaced by inertia moment J of movable parts. In other words, the head actuator may have any suitable form. The head actuator need not necessarily drive the entire head, and can be used for driving part only of the head. What is essential is that it is capable of moving the light spot over a large distance in the radiation direction of the disk. It may be of such a construction that can serve both as the tracking actuator and the head actuator.

In the embodiment described, the head actuator drive current is input to the state-observer unit. However, what is essential is that an acceleration of the optical head or a parameter related to the acceleration be input and used for the determination of the estimated track traverse velocity.

As has been shown above, according to the configurations described above, the velocity-control system of the optical drive device is provided with a state-observer unit which operates at the time of track-access. This state-observer unit receives an output signal from the velocity-detection circuit and the head-actuator drive current signal. On the basis of these signals, the state-observer unit estimates the track traverse velocity, which is then used for the velocity control. Accordingly, the stability of the velocity control system is improved, and the velocity control is enabled during access over a short distance as well as access over a long distance. The access time is substantially reduced, and the performance of the velocity control system does not depend on the fluctuation of the mechanical resonance frequency of the optical head, or the number of the resonance frequencies. Assembly of the head actuator and the optical head is therefore facilitated.

Figure 16:
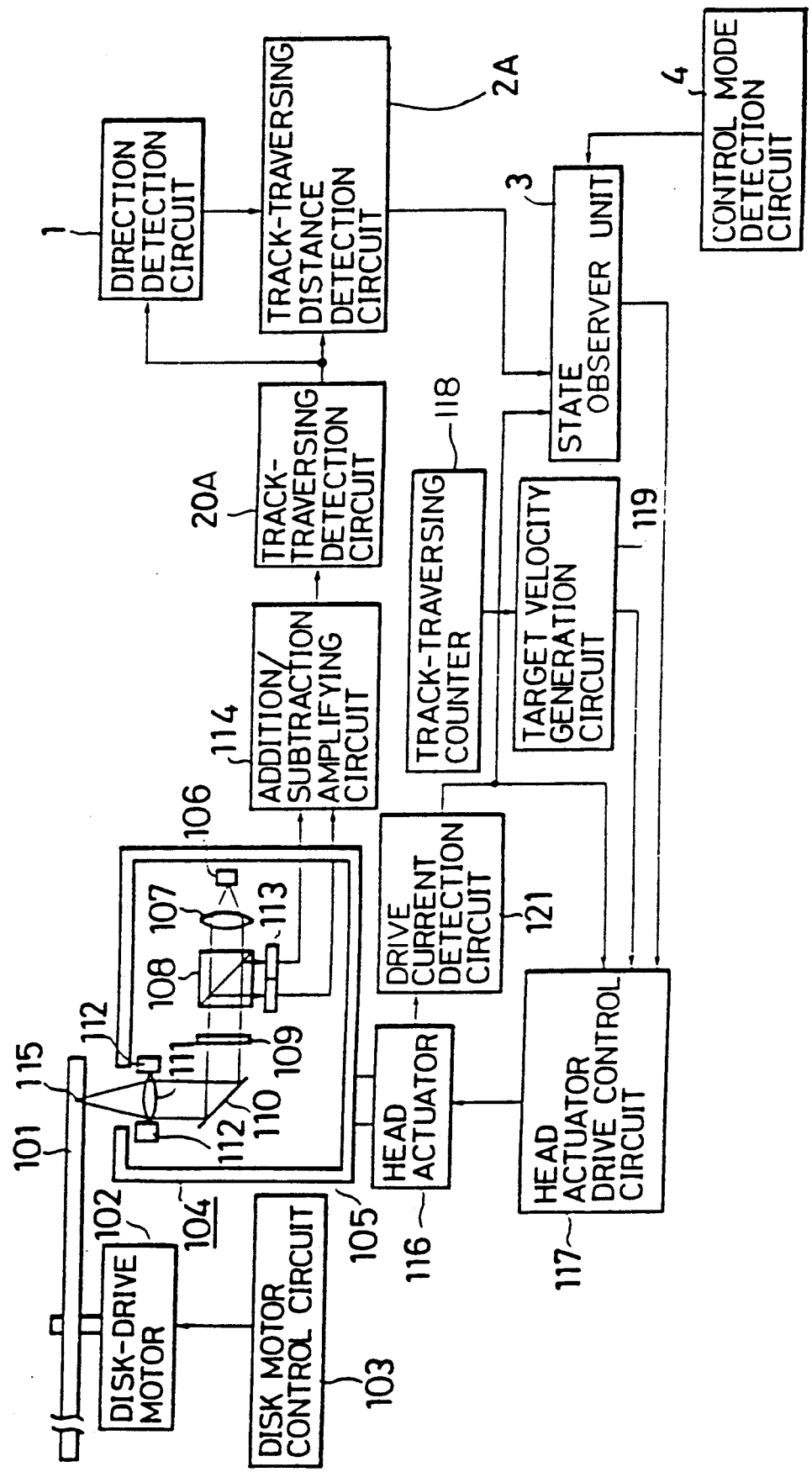
FIG. 16 is a block diagram of the optical disk drive device of another embodiment of the invention.

FIG. 16 shows a block diagram of a system in accordance with another embodiment of the present invention. In this drawing, reference numerals identical to those in FIG. 1 designate identical or corresponding elements, and their description is omitted, and the following explanation is concentrated mainly on elements which are different from those shown in FIG. 1.

A track-traversing detection circuit 20 receives the difference and sum signals from the addition/subtraction amplifying circuit 114. These signals are used to detect track traverse. A direction-detection circuit 1 receives the output from the track-traverse detection circuit 20 for detecting the track traverse direction. A track-traversing distance detection circuit 2A receives signals from the direction-detection circuit 1 and, on the basis of these signals, counts up or counts down the output signal from the track traverse detection circuit 20A.

A state-observer unit 3 receives the drive current signal detected by the drive current detection circuit 121, which detects the drive current of the head actuator 116, and a track-traversing distance detection signal from the track-traversing distance detection circuit 2A. On the basis of the above signals, the state-observer unit 3 estimates the track traverse velocity which is closer to the true value. An output signal from the state-observer unit 3 is sent to a head-actuator drive control circuit 117.

A control-mode detection circuit 4 is a circuit, which when the light spot 115 is following the center of a track, outputs a command for resetting an integrator which is built in the state-observer unit 3.

Figure 17:
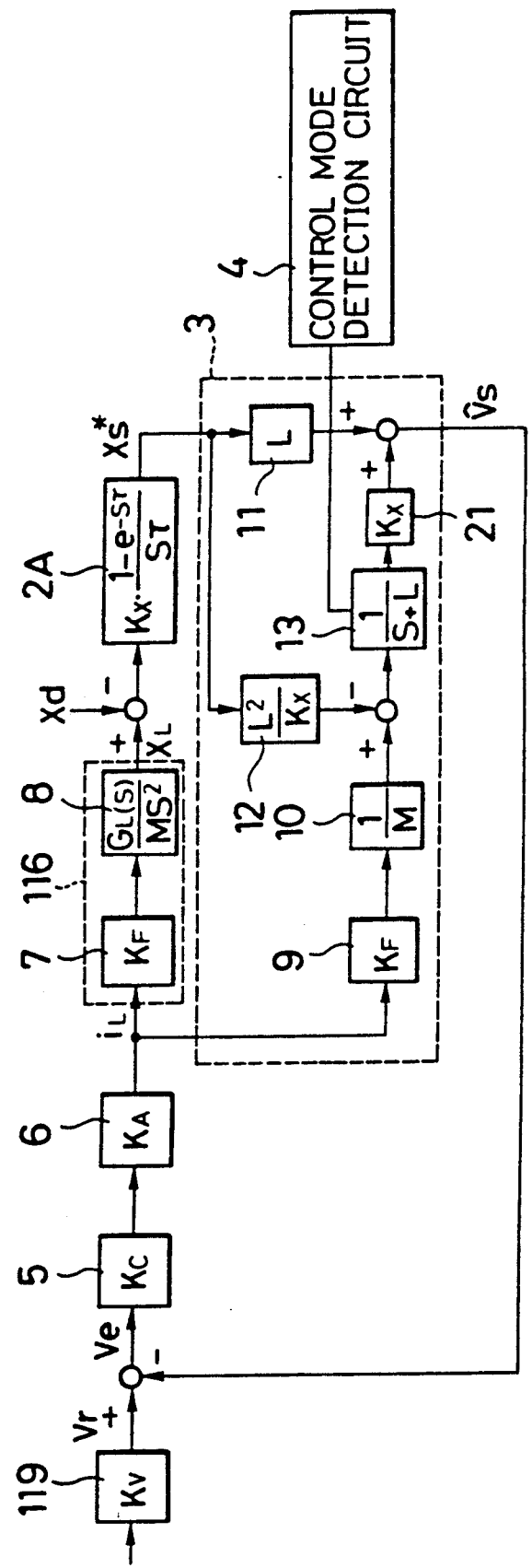
FIG. 17 is a block diagram of the velocity-control system incorporated in the optical disk drive device.

FIG. 17 shows a transfer-function block diagram of the velocity-control system of FIG. 16. In FIG. 17, the state-observer unit 3, the control-mode detection circuit 4, and the track-traversing distance detection circuit 2A correspond to the elements designated with the same reference numerals in FIG. 16. In addition, a gain-compensation circuit 5, a head-actuator drive circuit 6, a force-constant block 7 of the head actuator, and mechanical-resonance-characteristic block 8 are the same as those in FIG. 2.

The state-observer unit 3 is comprised of gain elements 9, 10 and 21, feedback gain elements 11 and 12, a first-order delay element 13, a subtractor 14A and an adder 15A.

The gain element 9 has a gain $K_F$ equivalent to the force constant (block 7) of the head actuator 116, receives the drive current signal detected in the head actuator drive circuit 6, and outputs an estimated value of the drive force. The gain element 10 has a gain 1/M which is the reciprocal of the mass of the movable part of the head actuator 116, the optical head 104, and the like movable at the time of access. The feedback gain elements 11 and 12 receive a track-traversing distance detection signal $X_S^*$ from the track-traversing distance detection circuit 2A.

The subtractor 14A subtracts the output of the feedback gain element 12 from the output of the gain element 10. The output of the subtractor 14A is an estimated value which is closer to the true acceleration and is input to the first-order delay element 13. The first-order-delay element 13 can be reset by an output signal from the control-mode detection circuit 4.

The gain element 21 simulates a track-traversing distance detection circuit 2A. The adder 15A adds the output signal from the feedback gain element 11 and the output signal from the gain element 21, and the sum is obtained at an adder 15A appears on the output of the state-observer unit 3 to serves as an estimated velocity signal $V_S$.

Figure 18:
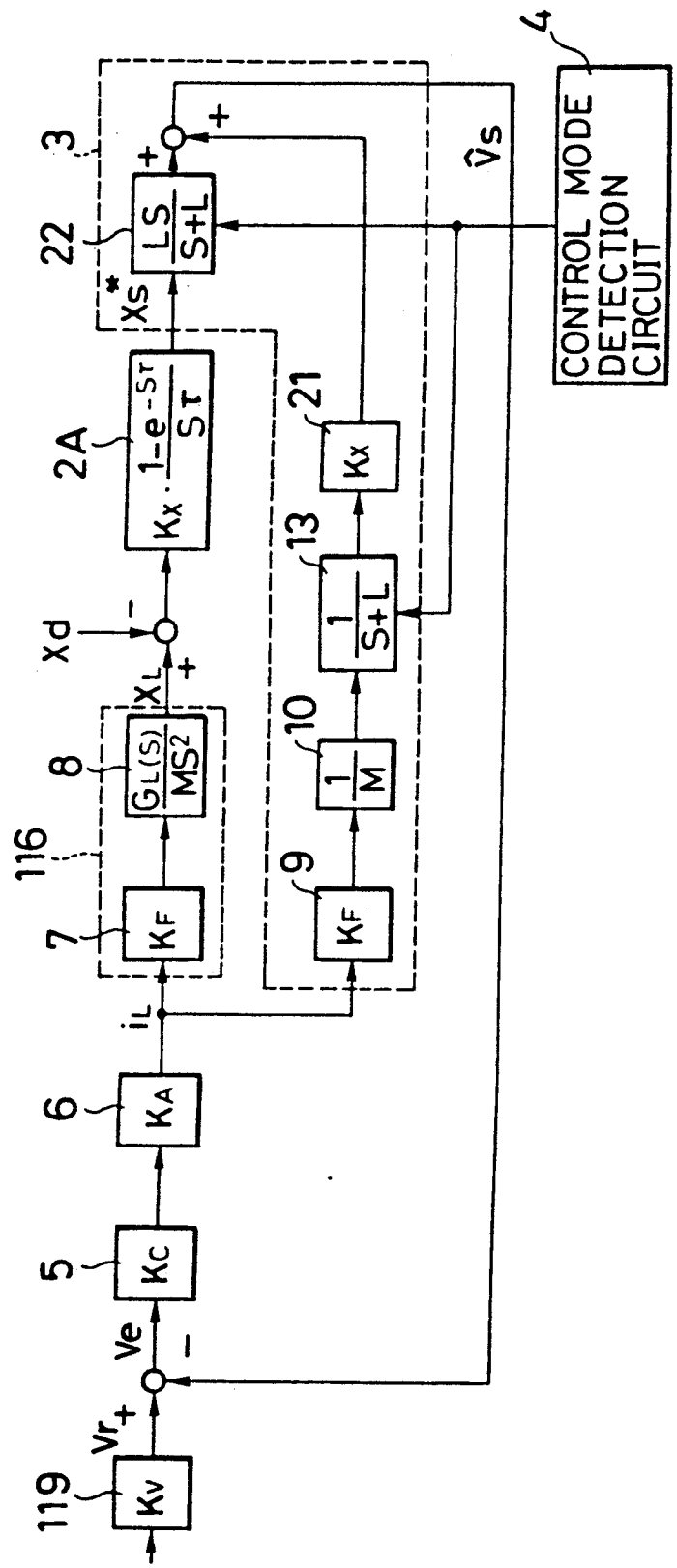
FIG. 18 is a block diagram of another velocity-control system which can be built in the same optical disk drive device.

FIG. 18 shows another embodiment of a state-observer unit 3, which is a modification equivalent to the state-observer unit 3 in FIG. 17. In FIG. 18, reference numerals identical to those in FIG. 17 designate identical or corresponding elements. In this embodiment, the output from the gain element 21 and the output of an arithmetic element 21 are added at an adder 16A, and the sum, forming the estimated-velocity signal $V_S$, is produced on the output of the state-observer unit 3. Similar to the case with first-order delay element 13, a predetermined part of the arithmetic element 22 can be reset by means of an output signal form the control-mode detection circuit 4.

Figure 19:
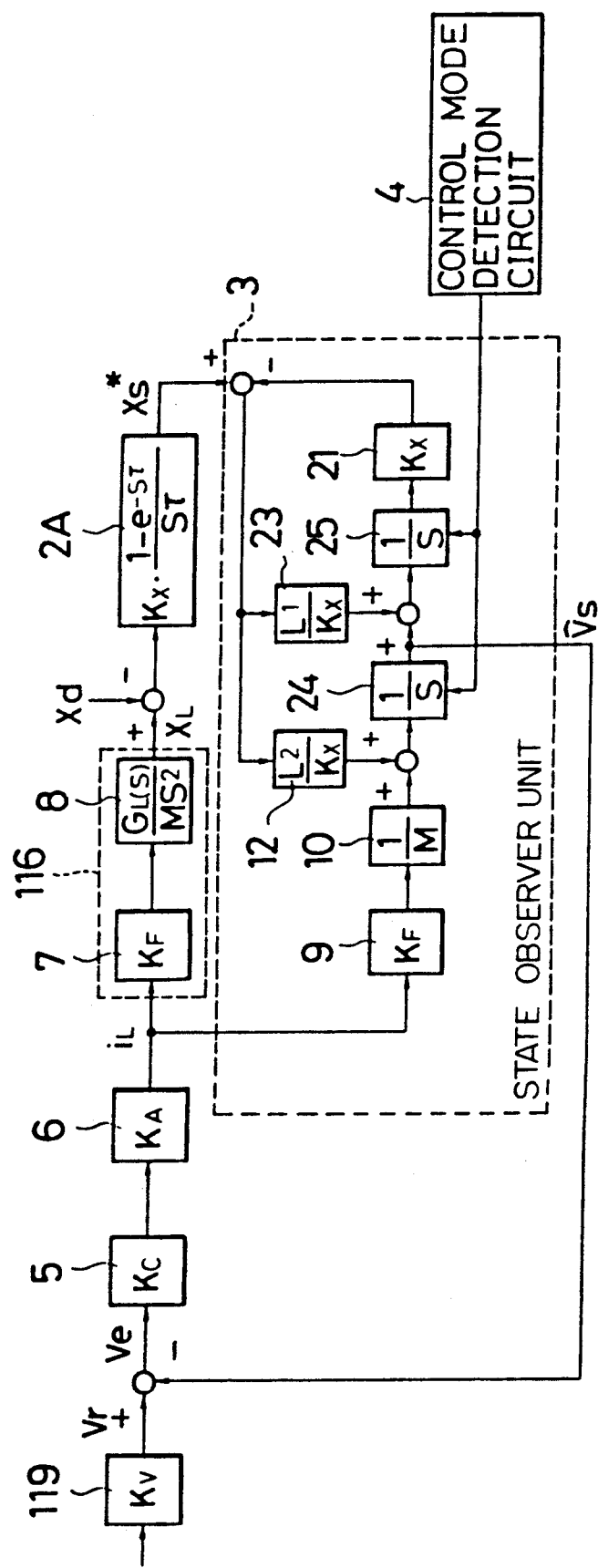
FIG. 19 a block diagram of another velocity-control system built in the optical control system.

FIG. 19 is a block diagram showing transfer functions in a further embodiment of the velocity-control system of FIG. 16, which is expressed differently from that shown in FIG. 17. Particularly, the state-observer unit 3 is in a different form from those in FIG. 17 and FIG. 18. In FIG. 19, reference numerals identical to those in FIG. 17 designate identical or corresponding elements. Reference numeral 23 designates a feedback gain element 23, and reference numerals 24 and 25 designate integrators which are reset by the control-mode-detection circuit 4.

Figure 20:
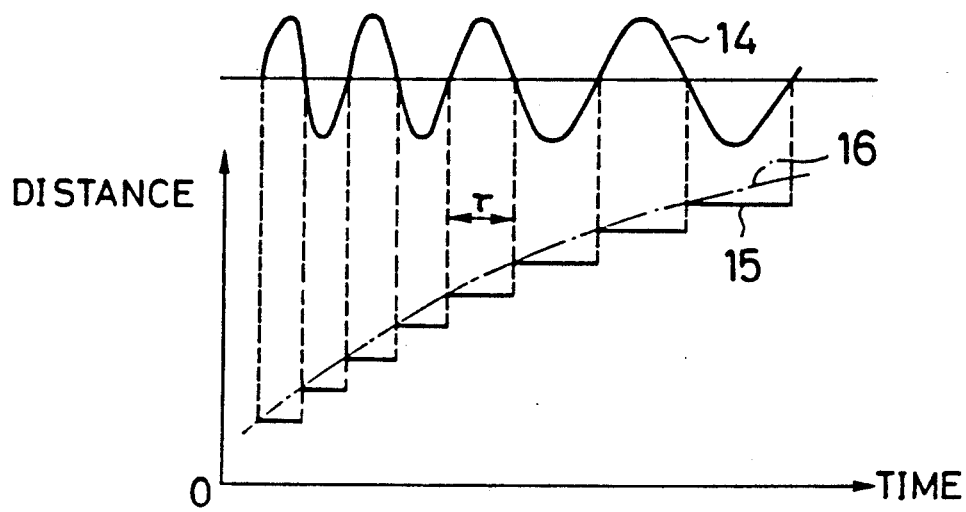
FIG. 20 is a diagram which explains the operation of the track-traversing detection circuit in the optical disk drive device.

FIG. 20 shows waveforms which appear at various parts during velocity control. Reference numeral 14 designates a track-traversing sensor signal obtained at the output of addition/subtraction amplifying circuit 114 of FIG. 16. Reference numeral 15 designates an output signal (track-traversing distance detection signal) $X_S^*$ of the track-traversing distance detection circuit 2A. Reference numeral 16 designates a true track-traversing distance, which is not detected in reality.

Figure 21:
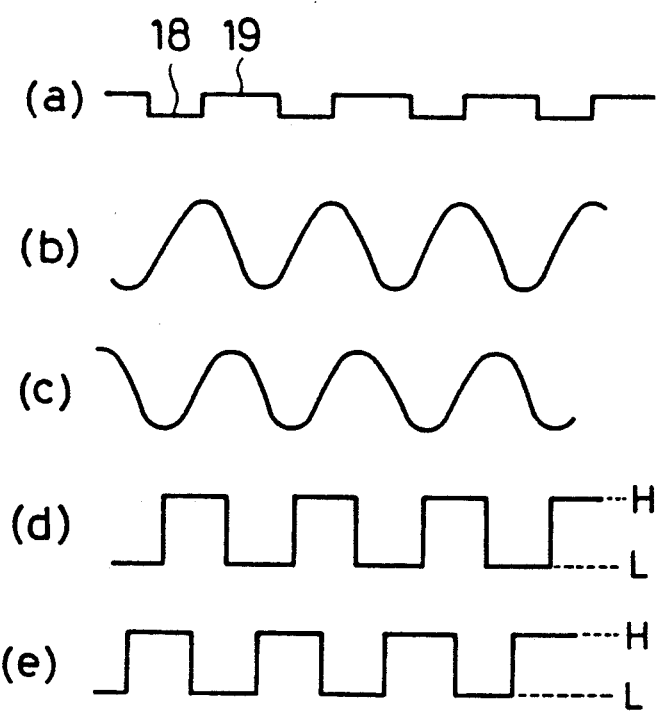
FIGS. 21(a–e) are diagrams which explain the operation of the direction-detection circuit of the optical disk drive device.

FIG. 21 shows a relationship between the track grooves and the detected signals. FIG. 21 (a) is a cross-sectional view of an optical disk. In this drawing, reference numeral 18 designates a groove portion and 19 designates a portion between the grooves. FIG. 21(b) shows a difference signal (tracking error signal) from the addition/subtraction amplifying circuit 114 of FIG. 16. FIG. 21(c) illustrates the sum signal from the addition/subtraction amplifying circuit 114, and FIGS. 21(d) and (e) are respective comparator signals for those shown in FIGS. 14(b) and 14(c).

Figure 22:
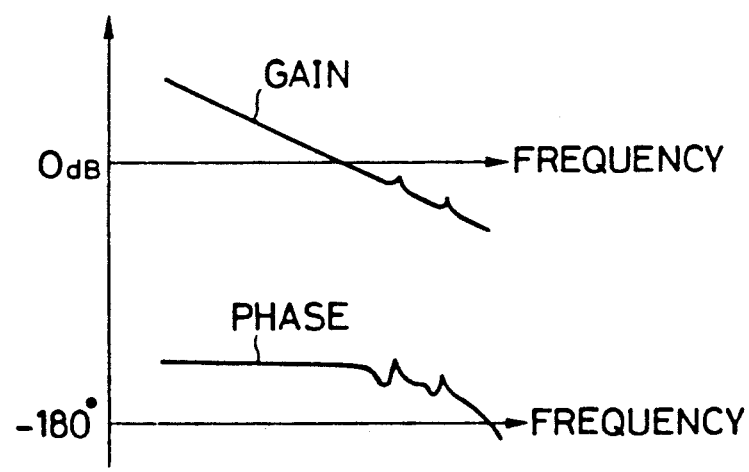
FIG. 22 is an example of an open-loop transfer characteristics of the velocity-control system of FIG. 17.

FIG. 22 shows the open-loop transfer characteristics of the velocity control system shown in FIG. 17, showing the frequency characteristics of the gain and phase.

The system described above operates in the following manner:

A light which is emitted from the light source 106 is collimated by a collimator lens 107, passes through a polarization beam splitter 108. The output of the polarization beam splitter 108 is a linearly polarized light and is passed through a λ/4 plate, is reflected by a mirror 110, and is then focused by an objective lens 111 into a light spot on the surface of an optical disk 101 which is rotating steadily.

The light reflected from the optical disk 101 passes through the objective lens 111 to the polarization beam splitter 108, where the light is reflected, and incident onto a split-photodetector 113.

The light received by the split-photodetector 113 is photoelectrically converted into electrical signals. The electrical signals are then combined (added and subtracted) at the addition/subtraction amplifying circuit 114, into the sum signal and the tracking error signal.

At the time of tracking, the sum signal and the tracking error signal are passed through the track traverse detection circuit 20A, and the direction detection circuit 1, to the track-traversing distance detection circuit 2A and the track traversing counter 118.

The pulsative track traverse detection signals output from the track traverse detection circuit 20 are accumulated positively (added) or negatively (subtracted) at the track-traversing distance detection circuit 2A, depending on whether the track traverse direction is outward (toward the outer periphery) or inward (toward the axis), the track traverse direction being detected by the detector 1. The result of the accumulation is input to the state-observer unit 3.

For example, during outward access when the light spot 115 is moved outward, the pulsative track traverse detection signals are counted up by a suitable counter. During inward access when the light spot 115 is moved inward, the pulsative track traverse detection signals are counted down. In this way, the desired total track-traversing distance (as represented by the total number of tracks traversed) is detected.

At the same time, the drive current signal of the head actuator 116 as detected by the drive current detection circuit 121 is also input to the state-observer unit 3.

The resetting of the integrator in the state-observer unit 3 is then cleared by the output of the control mode detection circuit 4, so that the state-observer unit 3 can operate.

The output of the track-traversing counter 118 is transmitted to the target velocity generation circuit 119 from which a target velocity corresponding to the remaining number of tracks is output.

In accordance with the output from the target-velocity generation circuit 119, the output from the state-observer unit 3, and the output from the drive current detection circuit 121, the head-actuator drive control circuit 117 controls the operation of the head actuator 116, and hence, the track traverse velocity.

Operations of the state-observer unit 3 will now be described with reference to FIGS. 17, 18 and 19. An output signal of the gain-compensation circuit 5, which determines the frequency-band, i.e., the operating range of the velocity-control system, corresponds to a drive command signal for the head actuator 116. This signal is converted into a drive current in the head-actuator drive circuit 6, which is multiplied with the force constant $K_F[N/A]$ in the head actuator 116 into the drive force, which is multiplied with 1/M, which is the reciprocal of the mass, into acceleration. The acceleration is integrated into velocity, and the velocity, in turn, is integrated into a distance.

When the above-mentioned frequency-band of the velocity control system is in the high-frequency zone, there is also an influence of the high frequency-band resonance characteristic $G_L(S)$ of the head actuator 116. Thus, the head actuator 116 will move for a certain distance $X_L$.

When there is a track fluctuation $X_d$ due for example to the eccentricity of the optical disk 101, the difference between $X_L$ and $X_d$ will correspond to the track-traversing distance. This distance is detected by the track-traversing detection circuit 2A and is converted, by being multiplied with gain $K_X[V/m]$, which is the sensitivity, into an electrical signal.

As shown in FIG. 20, the track-traversing distance signal 15, which is detected on the basis of the tracking period of the track-traversing sensor signal 14, output from the addition/subtraction amplifying circuit 114, is obtained when a track traverse is detected, as an average traverse velocity over immediately preceding half a track. During deceleration, the track traverse velocity signal is therefore stepwise, and has a zero-order hold characteristics, as shown at the block 2A in FIG. 17. As the track traverse velocity is lowered, the track traverse period becomes longer. The value of $\tau$ is smaller during high velocity operation, and is larger during low velocity operation.

Basically, the state-observer unit 3 comprises electronic circuits which simulate the transfer characteristics of the head actuator 116 and the track traversing distance detection circuit 2A, excepting the high frequency-band resonance characteristics $G_L(S)$ of the head actuator 116 and the zero-order hold characteristic $(1-e^{-S\tau})/S\tau$ of the track-traverse-distance detection circuit 2A.

In the state-observer unit 3 shown in FIG. 17, the drive current signal $I_L$ of the head actuator 116, which has been detected in the drive-current detection circuit 6, is converted through the gain elements 9 and 10 into acceleration information.

The subtractor 14A determines the difference between the acceleration information and the output of the feedback gain element 12 which receives the detected track-traverse distance $X_S^*$, and the difference is then passed through the first-order delay element 13 and the gain element 21, into a velocity signal. At the adder 15A, the velocity signal is added to the output of the gain element 11 which also receives the detected track-traverse distance $X_S^*$. The resultant sum signal is the estimated velocity $V_S$.

The transfer function from the two inputs to the state-observer unit 3, i.e., the drive current $I_L$ of the head actuator, and the track-traversing distance $X_S^*$, to the output of the state-observer unit 3, i.e., the estimated velocity $V_S$ can be expressed as follows:

$$V_S = \frac{1}{S+L} \frac{K_F K_V}{M} I_L + \frac{LS}{S+L} X_S^* \quad (22)$$

More specifically, because the time constant of the transfer characteristics from the drive current signal $I_L$ to estimated velocity signal $V_S$, as well as from the track-traversing distance signal $X_S^*$ to the estimated velocity signal $V_S$ is equal to 1/L, provided that L>0, the state-observer unit 3 is stable. Value L is parameter which determines the rate of convergence of the estimated velocity signal $V_S$. For example, if the convergence is to be performed with the time constant equal to 1 ms, L is selected equal to $10^3$.

Considered below is the significance of the formula (22) for the respective frequency-bands. First of all, because $K_F I_L/M$ corresponds to the acceleration of the optical head 104, if the terms one or more orders smaller may be neglected, the following relation (23) holds provided that the track fluctuation value $X_d$ is sufficiently smaller than the movement distance $X_L$ of the optical head 104.

$$|SX_S^*| \sim \left| \frac{1}{S} \frac{K_F K_V}{M} I_L \right| \quad (23)$$

Substituting $S=j\omega$ (I) If $\omega << L$ ($|S| << L$), $$V_S \sim \frac{1}{L} \frac{K_F K_V}{M} I_L + SX_S^* \quad (24)$$

If L~1000, from formula (23) one can obtain the following:

$$|SX_S^*| \sim \left| \frac{1}{S} \frac{K_F K_V}{M} I_L \right| >> \left| \frac{1}{L} \frac{K_F K_V}{M} I_L \right| \quad (25)$$

Therefore $$V_S \sim SX_S^* \quad (26)$$

(II) If $\omega >> L$ ($|S| >> L$), $$V_S \sim \frac{1}{S} \frac{K_F K_V}{M} I_L + LX_S^* \quad (27)$$

From formula (23), the following is derived:

$$|LX_S^*| << |SX_S^*| \sim \frac{1}{S} \frac{K_F K_V}{M} I_L \quad (28)$$

Therefore, $$V_S \sim \frac{1}{S} \frac{K_F K_V}{M} I_L \quad (29)$$

is obtained.

It is seen from formulae (26) and (29), that the estimated velocity signal $V_S$ is equal to the differential value $SX_S^*$ of the track-traversing distance detection signal $X_S^*$ in the low frequency-band, and is equal to the integral of the head-actuator drive current $I_L$ in the high frequency-band. Thus, the frequency forming the boundary between the above-mentioned high and low frequency-bands is L [rad/sec] which coincides with the frequency band of the state-observer unit 3. If, for example, if is it assumed that L= $\infty$, formula (22) will be transformed into the following:

$$V_S = SX_S^* \quad (30)$$

Because in this case, the drive current $I_L$ is not used for the determination of the estimated velocity $V_S$, and the estimated velocity signal $V_S$ is given by the differential of the track-traversing distance signal $X_S^*$, the dead time developed in track-traversing distance detection circuit 2A could not be compensated. If, on the contrary, L is assumed equal to 0, then formula (22) will be transformed into the following expression:

$$V_S = \frac{1}{S} \frac{K_F K_V}{M} I_L \quad (31)$$

Because in this case, the track-traversing distance signal $X_S^*$ is not used for the determination of the estimated velocity $V_S$, so there is no adverse effect from the dead time of the track-traversing detection circuit 2A or the high resonance-frequency characteristics of the head actuator 116. However, even a slightest offset in the drive current $I_L$ will increase the estimation error of the estimated velocity signal $V_S$.

Since the estimated velocity signal $V_S$ does not include the track fluctuation amount Xd at all, the estimate velocity is comprised of an estimated value of the velocity of movement of head actuator 116, rather than the track traverse velocity. When the head velocity is low, and the head velocity $V_L$ becomes so low that the track fluctuation velocity $V_d$ cannot be ignored, an error which is caused in the estimated velocity signal $V_S$ becomes substantial.

Thus, by setting the parameter L to be sufficiently lower than the high frequency-band resonance frequency of the head actuator 116 and the track traverse frequency, and sufficiently higher than track fluctuation fundamental frequency, the estimated velocity signal $V_S$ can be made to a assume a value which is midway between the value given by formula (26) ad the value given by the formula (29), and the dead time due to the track-traversing distance detection circuit 2A can be compensated to a certain extent.

On the basis of formula (22), the transfer characteristics from the differential value $SX_S^*$ of the track-traversing distance signal $X_S^*$ to the estimated-velocity signal $V_S$ can be represented by the characteristic of a first-order low-pass filter, i.e., $1/(1+S/L)$, the estimated velocity signal $V_S$ will not be disturbed substantially even if $SX_S^*$ corresponding to the detected-velocity signal is disturbed, e.g., under the effect of recording bit or drop-outs on the optical disk 101.

FIG. 18 is another modification which is an equivalent conversion form that shown in FIG. 17. Because in both cases the transfer characteristics of the state-observer unit 3 are equivalent, the description of operation of the modified system is omitted.

FIG. 19 shows a block-diagram of the velocity-control system which incorporates the state-observer unit 3 of another modification. In this modification, the gain elements 9, 10 and 21, and the integrator elements 24 and 25 simulate the transfer characteristics of the track-traversing distance detection circuit 2A and the head actuator 116, which is the object of control. In FIG. 19, the drive current $I_L$ of the head actuator 116 is converted by the gain elements 9 and 10 into an acceleration, and then into a velocity signal by the integrator element 24, and then into a distance (over which the head has been moved or displaced) by the integrator element 25 and the gain element 21. The difference between the displacement-distance signal and output signal $X_S^*$ of the track-traversing distance detection circuit 2A is determined by a subtractor 18A, and is then sent through respective feedback gain elements 12 and 23 to adders 14A and 17A where they are added to the outputs of the gain element 10 and the integrator element 24. The outputs of the adders 14A and 17A are inputs to the integrator elements 24 and 25. In this way, the desired velocity control is achieved. In other words, the acceleration and velocity are corrected such that the estimated value of the track-traversing distance converges toward the track-traversing distance detection signal $X_S^*$, and the signal that is obtained by integrating the corrected acceleration signal in the integrator element 24 is the estimated velocity $V_S$. For the system of FIG. 19, the transfer characteristic from the track-traversing distance detection signal $X_S^*$ and the drive current $I_L$ of the head actuator 116 to the estimated velocity $V_S$ can be represented by the following formula:

$$\hat{V}_S = \frac{S + L_1}{S^2 + L_1 S + L_2} \cdot \frac{K_F}{M} I_L + \frac{L_2 S}{S^2 + L_1 S + L_2} X_S^* \quad (32)$$

Similar to the cases of FIGS. 17 and 18, if the boundaries between the frequency-bands is denoted by $\sqrt{L_2}$ of the state-observer unit 3 will be approximately as follows:

(I) When $\omega << \sqrt{L_2}$, $V_S \sim SX_S$ and
(II) When $$\omega >> \sqrt{L_2}, V_S \sim \frac{K_F}{MS} I_L$$

Thus, in the case of FIG. 19, the effects will be the same as in the systems of FIGS. 17 and 18.

Because the state-observer unit 3 of FIG. 19 has in general the same order (i.e., the same number of integrator elements) as the head actuator 116, it may be called a "same-order state-observer unit". As compared to this, the state-observer unit 3 of FIGS. 17 and 18 have the order one less than the head actuator 116, and therefore they can be called "minimum-order state-observer units". It is also known that by means of the so-called Gopinath method, the same-order state-observer unit of FIG. 19 can be converted into a minimum-order state-observer unit of the state-observer unit of the type shown in FIGS. 17 and 18.

In addition, during tracking of the tracks by the light spot 115, the integrator elements 13, 22, 24, and 25 (which are shown in FIGS. 17 to 19) are reset by a command from the control-mode detection circuit 4. This resetting is cleared simultaneously with the switching into the velocity-control mode. Since the track-traverse velocity during the tracking is certainly equal to zero, there will be no error in the initial value of the estimated velocity output from the state-observer unit 3 at the time immediately after the transition into the velocity-control mode. Moreover, even if an error occurs, the error is will be reduced to zero with the time constant $1/L$ or $1/\sqrt{L_2}$.

The open-loop transfer functions of the velocity control system shown in FIG. 17 can be obtained by calculation in accordance with the following formula:

$$G_{02}(S) = \frac{K_C K_A K_F K_V}{MS} \cdot \frac{S + L \cdot G_L(S) \cdot \frac{1 - e^{-S\tau}}{S\tau}}{S + L} \quad (33)$$

$$= \frac{K_C K_A K_F K_V}{MS} \cdot \frac{1 + \frac{L}{S} G_L(S) \frac{1 - e^{-S\tau}}{S\tau}}{1 + \frac{L}{S}}$$

If the high-band resonance characteristic $G_L(S)$ of the head actuator 116 has a peak at a frequency $\omega_L$, by setting L to satisfy $L << \omega_L$, then the following relation holds;

$$\left| \frac{L}{S} G_L(S) \right|_{S = j\omega_L} = \frac{L}{\omega_L} |G_L(j\omega_L)| \quad (34)$$

The influence which is exerted by the value of the high frequency-band resonance peak of the head actuator 116 on the open-loop characteristic of formula (33) will be suppressed to $L/\omega_L$ times ($L/\omega_L << 1$), and as shown in FIG. 22, the high frequency-band peaks of the gain characteristics will be smaller than those shown in FIG. 6.

Figure 4:
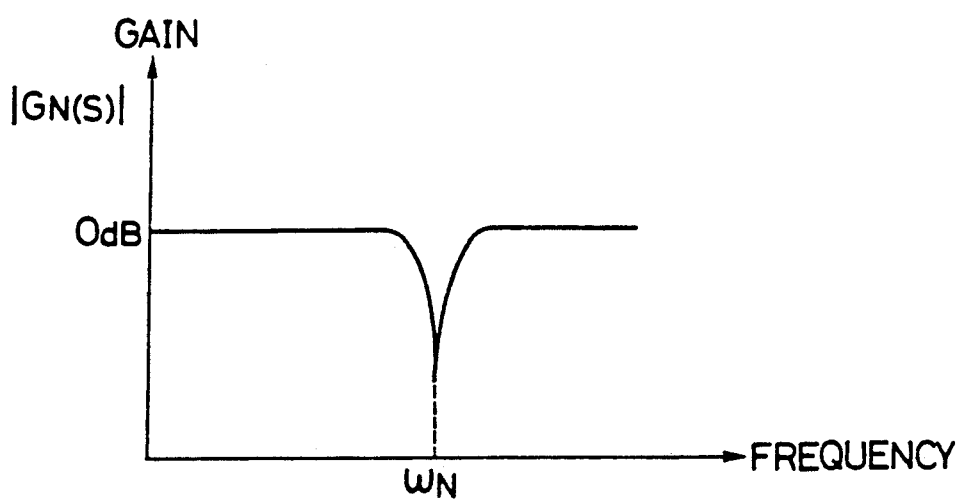
FIG. 4 shows an example of frequency characteristics of a notch filter built in the velocity-control system of FIG. 2.

The resultant characteristics is also different from the frequency characteristic of a notch filter 122 shown in FIG. 4, and the high-band resonance frequency $\omega_L$ need not be a specific frequency. Generally, if the frequency satisfies condition $\omega_L << L$, the suppression effect will be obtained at an arbitrary frequency, and will be uniform even in the presence of several peaks. Similar to mechanical resonance characteristic $G_L(S)$, the phase delay and the gain drop due to the zero-order hold characteristic of the track-traversing distance detection circuit 2A, in formula (33) are alleviated. Therefore, the phase of the open-loop characteristics extends to the high band, and the stability of the system is improved.

The method of detecting the track-traverse direction by the direction detection circuit 1 is similar to that described with reference to FIG. 12. Responsive to the detected track-traversing direction, the polarity of the track-traversing detection signal of the track-traversing distance detection circuit 2A is switched, and accumulated positively (counted up) or negatively (counted down). Thus, a positive feedback of the control system is avoided, and a stable operation is ensured.

In the above-described embodiment, the track-traversing distance detection circuit switches the polarity of the track-traversing signal and performs the positive or negative accumulation on the basis of the detected track traverse direction. Where, during velocity control, reversal of the track traverse direction does not occur or occurs only for a short period, and because, as shown by formula (29), the estimated velocity is determined substantially by the drive current, $I_L$, the positive feedback does not take place in the velocity-control system, the direction detection circuit may be omitted.

In the embodiments of FIGS. 17, 18 and 19, the head actuator was a linear actuator which moves linearly. The head actuator may alternatively be a rotary-type actuator. In this case, the mass M of the movable parts should be replaced by inertia moment J of movable parts. Where the optical head is a separate type in which part only of the optical head is movable, the head actuator may be designed to move the movable part of the optical head. What is essential is that it is capable of moving the light spot over a large distance in the radiation direction of the disk. It may be of such a construction that can serve both as the tracking actuator 112 (in FIG. 17) and the head actuator.

In the embodiments described, a drive current detection means is used for detecting the acceleration of the head actuator. But the acceleration may alternatively be detected by an acceleration sensor attached to the movable part of the head, and its output may be supplied to the state-observer unit.

Furthermore, in the embodiments described above, the track traverse speed and the track traverse direction are detected on the basis of the signals obtained by determining the sum and the difference on the split-photodetector outputs. But they may obtained in other ways. For example, when a sample servo system using an optical disk without track grooves is employed, the track traverse speed and the track traverse direction may be detected on the basis of an output of the tracking signal (tracking error signal) detection means or an output of a track traverse number detection means and an output of a means for detecting a signal corresponding to the reflected-light total-amount signal.

Furthermore, they may be detected from the address information or the like of the optical disk.

As has been shown above, the velocity-control system of the optical disk drive device described above is provided with a state-observer unit. At the time of track access, the track-traversing detection signal from the track-traversing distance detection circuit is integrated with its polarity changed under the effect of the output from the direction-detection circuit. This signal and the drive current signal of the head actuator are then input to the state-observer unit, which estimates the track-traversing velocity, and the actual track-traversing velocity of the light spot is controlled on the basis of the above-mentioned estimation. Such a velocity-control system is characterized by an improved stability of operation and provides, at the time of access, reliable velocity control with long distances. It is also possible to achieve velocity control with extremely short traversing distances. The system makes it possible to considerably reduce the access time.

The above configuration is efficient because the performance of the velocity-control system do not depend on such factors as manufacturing fluctuations of the mechanical resonance frequencies and the number of the mechanical resonance points of the head actuator and the optical head. Accordingly, the assembly of the head actuator and the optical head is facilitated.

Figure 23:
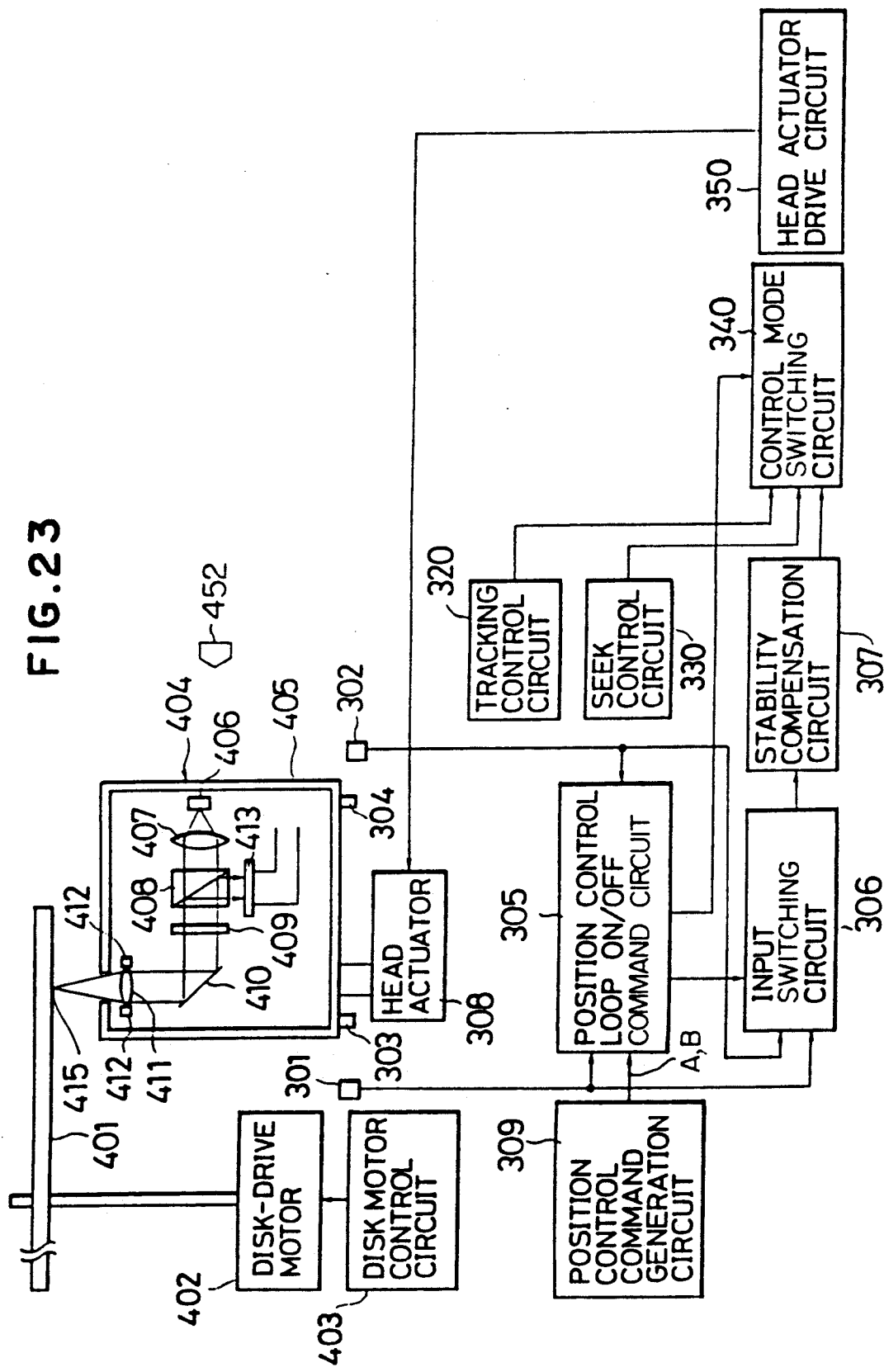
FIG. 23 is a block diagram of the device of another embodiment of the invention.

FIG. 23 is a block diagram of an information storage device of another embodiment of the present invention.

A disk motor 402 is rotated under the control of a disk motor-control circuit 403. The disk motor 402 drives a spindle which carries an optical disk 401. Located beneath the optical disk 401 is an optical head 404 which can be moved in the radial direction of the optical disk 401 by means of a head actuator 308. The optical head 404 is provided with an optical system which is similar to a conventional one and comprises a source of light 406, an objective lens 411, and a split-photodetector 413. Similar to the conventional device, an output from the split-photodetector 413 is sent to an input of an addition/subtraction amplifying circuit, not shown.

The optical head 404 has a frame 405 having light-blocking plates 302 and 304 provided on the lower surface of the disk inner edge and the disk outer edge of the frame 405. Movement of the optical head 404 in the disk radial direction is limited by engagement of part of the optical head 404 with inner and outer stoppers 451 and 452.

Head position detectors 301 and 302 are provided to cooperate with the light-blocking plates 303 and 304 to detect the presence of the optical head 415 is at specific positions between the inner and outer limits (where the optical head 404 engages with the stoppers 451 or 452), and the limits of the user utilizable region of the disk (the region that can be utilized by the user).

In the illustrated embodiment, the head position detectors 301 and 302 are of the optical type, and the presence of the optical head 404 in a respective position is determined when the path of light is interrupted by the light-blocking plates 303 and 304.

A position control command generation circuit 309 generates commands A and B input to the position control loop on/off command circuit 305 for initiating radial position control over the optical head 404. The commands A and B are sent to a position control loop on/off command circuit 305. The command A is an inner position control command which initiates inner position control. The command B is an outer position control command which initiates outer position control.

Output signals of the head position detectors 301 and 302 are also sent to the input of the on/off command circuit 305. This on/off command circuit 305 produces on its output an on/off command of the position control loop. This output is sent to an input switching circuit 306. On the basis of its input, this circuit selects either an output signal from the head position detector 301, or an output signal from the head position detector 302, and then sends the signal to a stability compensation circuit 307, which is provided for stabilization of the position control system.

Reference numeral 320 designates a tracking control circuit, 330 is a seek control circuit for control over seeking operation of an optical spot 415 to a desired track. Output signals of these circuits, as well as the output of the stability compensation circuit 307, are sent to a control mode switching circuit 340. The control mode switching circuit 340 is responsive to an output signal of the on/off command circuit 305 for selecting one of the above-mentioned three input signals, and switches the control mode between (a) tracking control mode, (b) seek control mode, and (c) position control mode. The selected signal is sent to a head actuator drive circuit 350. The head actuator 308 is driven by a signal obtained from the drive circuit 350, and moves the optical head 404 in the radial direction of the optical disk 401.

Figure 24:
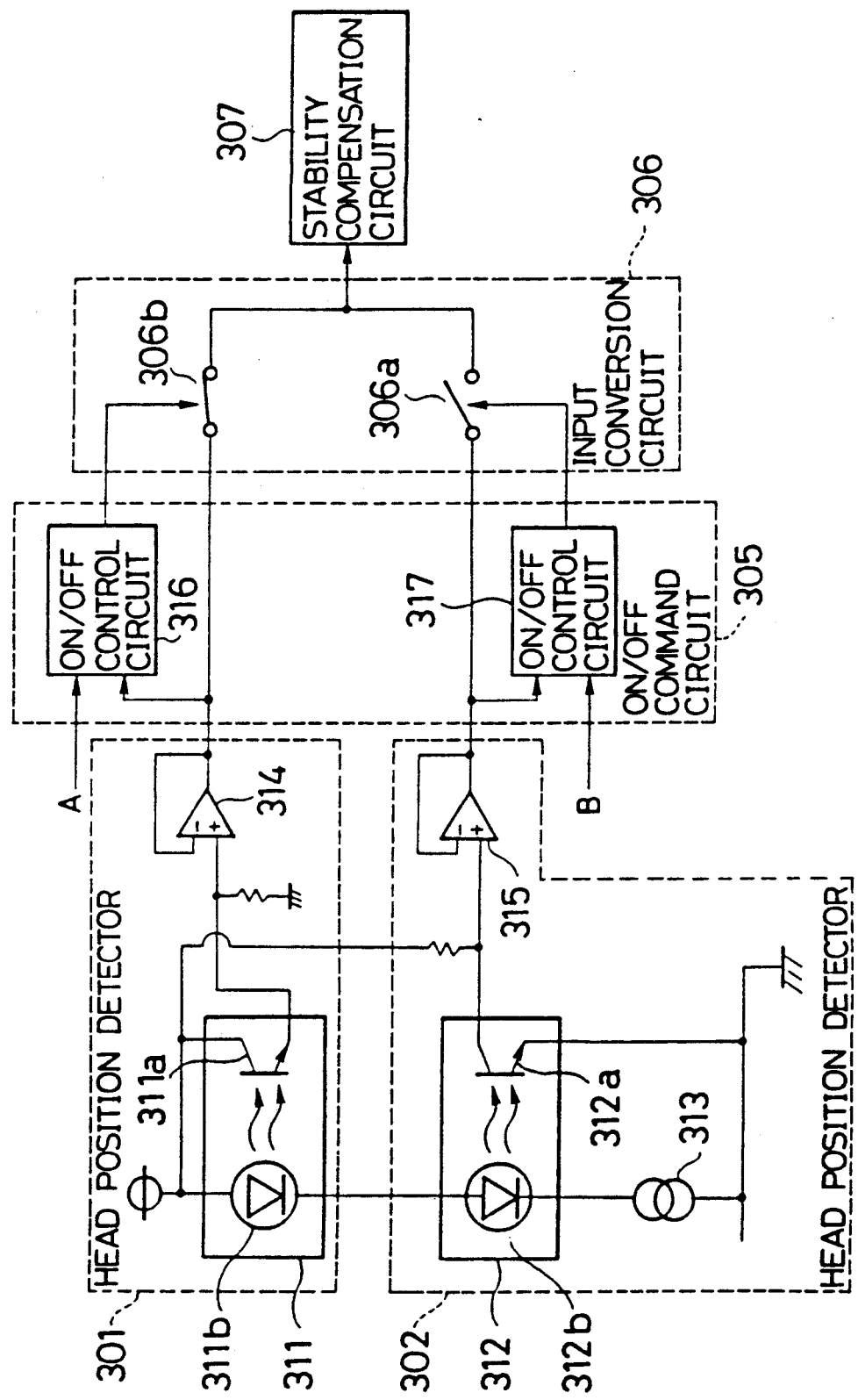
FIG. 24 and FIG. 25 show electric circuit diagrams of the elements of the device.

FIG. 24 is a circuit diagram which shows details of the head position detectors 301 and 302, the position control loop on/off command circuit 305, and the input switching circuit 306.

The head position detector 301 comprises a photointerrupter (photocoupler) 311 located in the area over which the light-blocking plate 303 is moved. Similarly, the head position detector 302 comprises a photointerrupter (photocoupler) 312 located in the area over which the light-blocking plate 304 is moved. Light-emitting diodes 311b and 312b of both photointerrupters 311 and 312 are connected in series, so that they can be driven from a constant-voltage current source 313 of the head position detector 302.

The collector of a phototransistor 311a, which is included in the inner position detector 301, is connected to a power supply node 390, while its emitter is connected to a buffer amplifier 314. The output of the buffer amplifier 314 is sent to the input of an inner potential control loop on/off control circuit 316, which is included in the on/off command circuit 305, as well as to a contact 305b in the input switching circuit 306.

The emitter of a phototransistor 312a, which is included in the outer head position detector 302, is connected to the ground potential node, while its collector is connected to the input of a buffer amplifier 315, and via a resistor to the power-supply node 390. The output of amplifier 315 is connected to the input of an outer position control loop on/off control circuit 317, which is incorporated in the on/off command circuit 305, as well as to a contact 306a of input switching circuit 306. The operation of the contacts 306a and 306b are opposite to each other. That is—when the contact 306a is ON, the contact 306b is OFF; and when the contact 306a is OFF, the contact 306b is ON.

Figure 25:
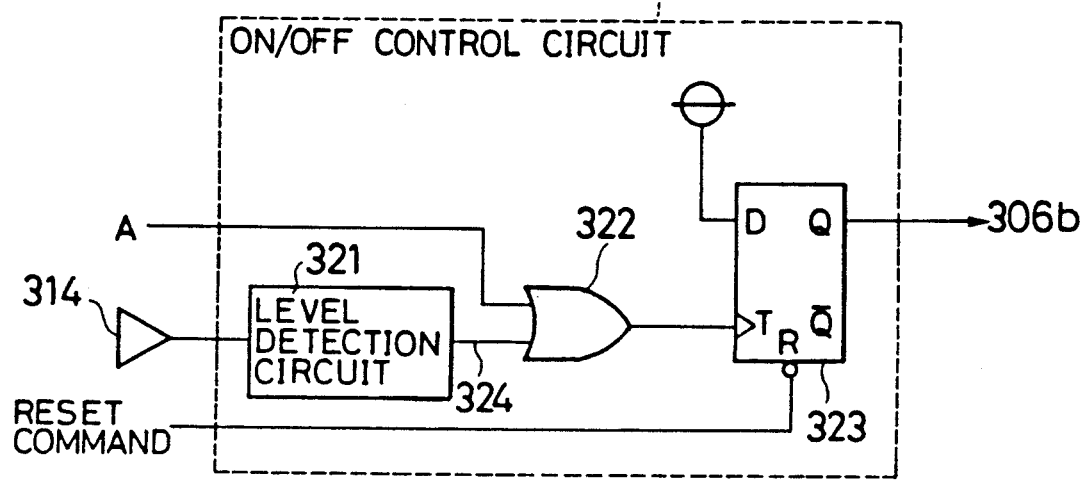

FIG. 25 is a schematic diagram of the inner position control loop on/off control circuit 316.

A level detection circuit 321, which receives on its input an output signal of buffer amplifier 314, may comprise, e.g., a so-called window comparator, which decides whether the level of the input signal is in a specified range. If it is in the specified range, it outputs an inner position detection pulse 324, which is sent to an OR gate 322. Another input on the OR gate 322 is the inner position control command A. An output signal of the OR gate 322 is applied to a trigger terminal T of a D-flip-flop 323. A terminal D of D-flip-flop 323 is fixed on a "High" level, while a reset terminal R receives a reset command from position control command generation circuit 309. Thus, a "Set" output Q of D-flip-flop 323 forms an inner position control loop on/off control command and serves as a control signal for switching for the contact 306b.

The outer position control loop on/off control circuit 317 has the same construction as the inner position control loop on/off control circuit 316 described above.

Operation of the device of the above embodiment will now be described.

Assume that, while the light spot is moved or positioned by means of the seek control circuit 330 or the tracking control circuit 320 for driving the head actuator 308 or the tracking actuator 412, the light spot moves out of the user utilizable region. If, for example, the light spot moves out toward the inner periphery, and the light path of photointerrupter 311 of the inner head position detector 301 is interrupted by the blocking plate 303, then a position control loop-on command is issued from the position control loop on/off command circuit 305, and the output of the inner position control circuit 1 is selected in the input switching circuit 306. This output is then transmitted to the control mode switching circuit 340 via a stabilization compensation circuit 307 formed for example of a phase-lead compensation circuit, etc.

In the control-mode switching circuit 340, when the position control loop in the position control loop on/off command circuit 305 is turned ON, the seek control, or tracking control, whichever has been conducted, will be turned OFF, and the output signal of the stability compensation circuit 307 will be transmitted to the head actuator drive circuit 350, and the head actuator 308 will be driven in such a manner that the light spot is moved to and held at a position where the output voltage of inner head position detector 301 coincides with the position of a predetermined reference voltage.

A similar operation is performed when the light spot moved out toward the outer periphery is similar.

The above-outlined operation will next be described in further detail.

Because output of the photointerrupter 311 shown in FIG. 24 is derived from the emitter, and the output of the photointerrupter 312 shown in FIG. 24 is derived from the collector, the relationship between the amount of passing light and the output of the photointerrupter 311, and the relationship between the amount of passing light and the output of the photointerrupter 312 are reverse to each other. When the light spot 415 of the optical head is within the user utilizable region, the output signal of the buffer amplifier 314 will be raised to the "High" level, while the output signal of the buffer amplifier 315 will remain on the "Low" level, as shown in FIG. 26.

Figure 26:
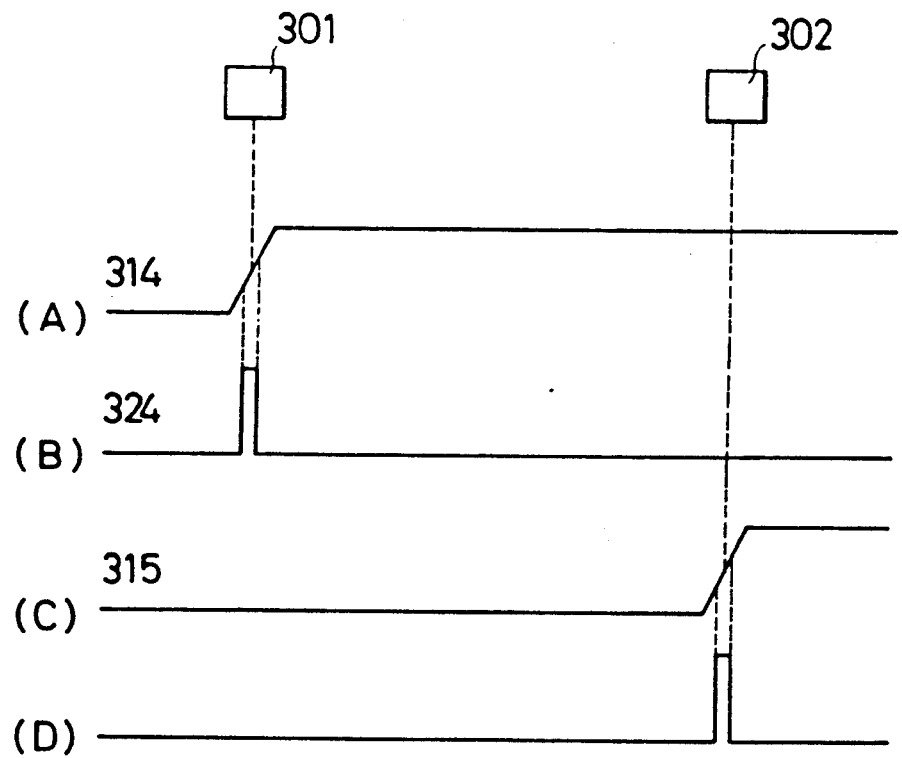
FIGS. 26(a–d) to FIGS. 28(a–c) are time charts which illustrate the operation of the device.

In FIG. 26, an abscissa shows the position of the optical head 404, and hence, the light-blocking plate 303 or 304. When the light-blocking plate 303 is shifted toward the inner periphery (toward the left in FIG. 26), then as shown in FIG. 26(A), the output signal of the buffer amplifier 314 is gradually decreasing, and will be at the "Low" level when the light is completely blocked.

When the light-blocking plate 304 moves toward the outer periphery, and interrupts the light path in the photointerrupter 312, the output signal of the buffer amplifier 315 is gradually increasing, and when the light is blocked completely, the output signal of the buffer amplifier 315 is at the "High" level.

These signals are received at the input of the level detector 321 in the inner position control loop on/off control circuit 316. In the level detector 321 is set an appropriate threshold value between the "High" and "Low" levels of the buffer amplifier 314. The detector therefore produces an inner position detection pulse 324 (FIG. 26(B)). In a similar manner, an outer position detection pulse (FIG. 26(D)) is formed in the outer position control loop on/off control circuit 317.

Figure 5:
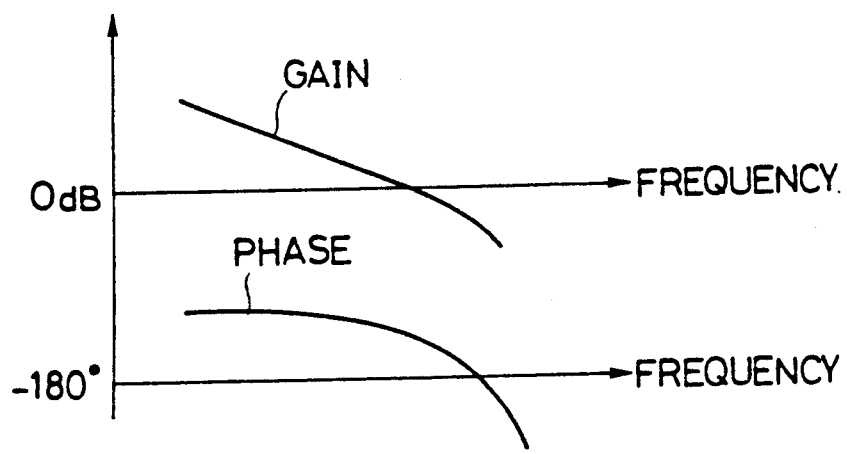
FIG. 5 and FIG. 6 respectively show examples of the open-loop characteristics of the velocity-control system shown in FIG. 2.
Figure 27:
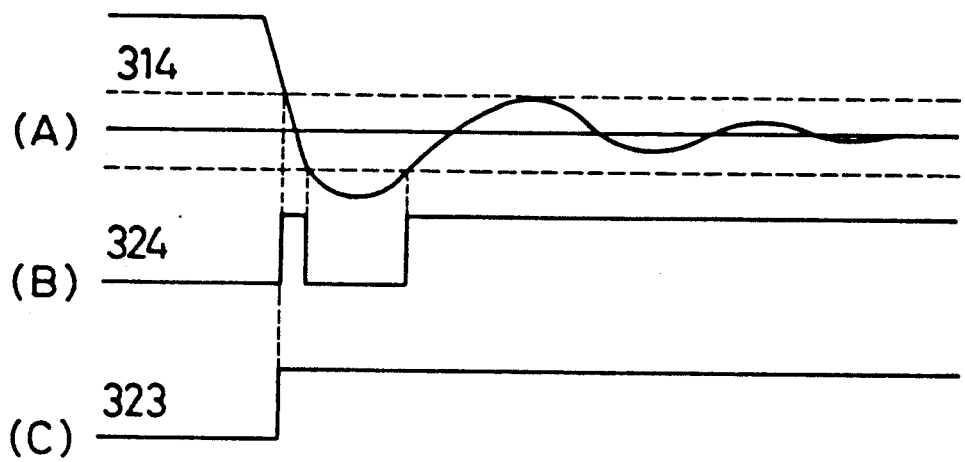

FIG. 27 shows the time variation pattern of the output signal of the buffer amplifier 314 at (A), the inner position detection pulse 324 at (B), and the "Set" output signal Q of D-flip-flop 323 at (C). When the optical head 404 moves toward the inner periphery of the disk, and light-blocking plate 303 blocks the photointerrupter 311, the output signal of the buffer amplifier 314 (FIG. 27(A)) decreases, which raises the inner position detection pulse 324 (FIG. 5(B)). As a result, D-flip-flop 323 is "Set", and the output Q is raised to the "High" level (FIG. 27(C)).

This "Set" output signal Q is sent to the contact 306b of the input switching circuit 306, and the output signal of buffer amplifier 314 is transmitted to the input of stability compensation circuit 307. When the optical head 404 moves further inside due to inertia, the output of buffer amplifier 314 goes down to the lower limit of the level detector 321, and the inner position detection pulse 324 falls to the lower level, but the D-flip-flop 323 will still be maintained at the "Set" state.

When the output signal of the buffer amplifier 314 is sent to stability compensation circuit 307, the head actuator 308 is automatically driven so that the level of this signal coincides with a target voltage representing the target position along the radial direction that is set in the control circuit system (FIG. 26(A)).

The optical head 304 whose light-blocking plate 303 has passed the inner head position detector 301 and is at the inside of the inner head position detector 301, the optical head is then returned to the position of the inner head position detector 301, and is held there.

In this way, even if the light-blocking plate 303 passes the head position detector 301 while the optical head 404 is moving toward the inner periphery of the disk, the optical head 404 returns to the head position detector 301. It is thus protected from collision with the stopper 451.

Apart from preventing the collision of the head with the stopper 451 under the "run-away" condition, the device of the present invention also stabilizes pull-in action into the operation of the focusing servo-system directly after power-on. This feature will now be described in more detail.

Figure 28:
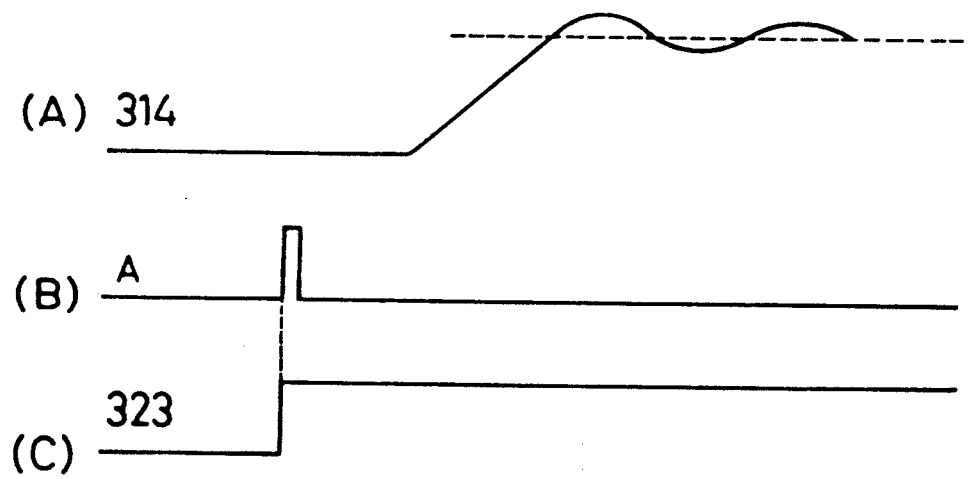

FIG. 28(A) shows an output signal of the buffer amplifier 314, FIG. 28(B) shows an inner position control command A, and FIG. 28(C) shows the "Set" output signal Q of the D-flip-flop 323. When the optical head 404 is at the innermost position in the optical head, at the time of power-on, the light-blocking plate 303 completely blocks the light path in the photointerrupter 311 of the inner detector 301. As a result, the output signal of the buffer amplifier 314 is at the "Low" level.

At the time of power-on, for the purpose of reading information from the control track, the position control command generating circuit 309 produces the inner position control command A (which is shown to be in the form of a pulse), which is supplied to the inner position control loop on/off circuit 316. This, in turn, triggers and sets the D-flip-flop 323, and the output signal Q is set to the "High" level. In the same manner as has been described earlier, the head actuator 308 will be driven such that the output signal of the buffer amplifier 314 will coincide with the target voltage shown by broken line in FIG. 27(A), and the optical head 404 will assume a position corresponding to that of the inner head position detector 301.

If the head position detector 301 is so positioned that the light spot 415 is then on the control track on the inner periphery side of the disk 404, even if the apparatus is installed inclined or some external forces are exerted at the time of power-on, it is ensured that the light spot be on the control track, and the information in this track can be read without fail. This enables subsequent controls to be performed correctly.

Where the optical head 404 is installed at the outer position, a similar control can be performed. For this purpose, the position control command generating circuit 309 may be arranged to produce an outer position control command B at the time of the power-on.

Figure 29:
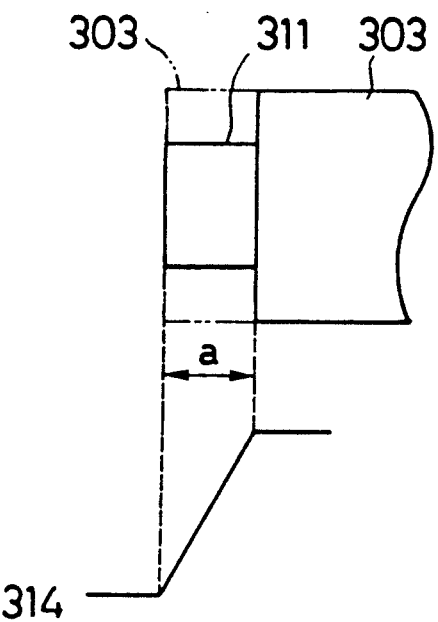
FIG. 29 to FIG. 31 are explanatory diagrams which show the area of linear output signals.

FIG. 29 shows a positional relationship between the light-blocking plate 303, the photointerrupter 311 and the output signal buffer amplifier 314. Where the inner edge of the light-blocking plate 303 is perpendicular to the direction of movement, within the boundary of the photointerrupter's width a the output signal will be changed linearly.

Figure 30:
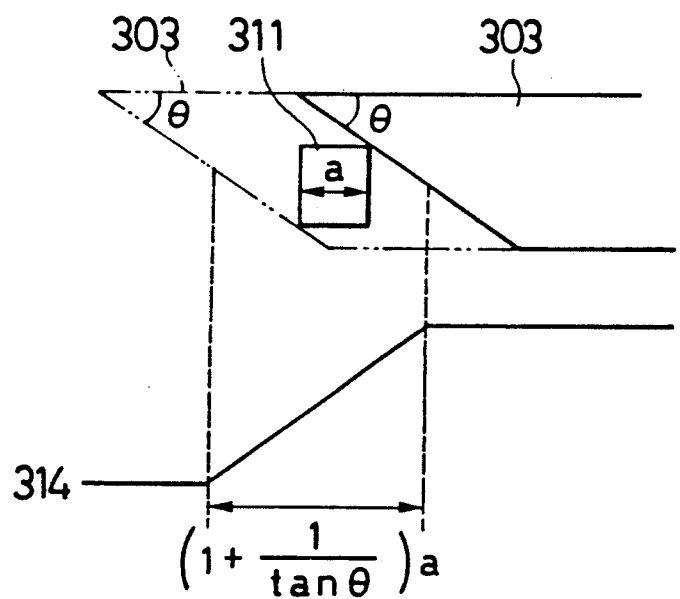

As compared to this and as shown in FIG. 30, with the inner edge of light-blocking plate 303 inclined at a certain angle $\theta$ to the direction of movement, the output signal of the buffer amplifier 314 will vary linearly within the range of $(1+1/\tan\theta)a$.

Finally, an expansion of the linear zone decreases the amount of overshooting in the position control circuit, and thus will shorten the setting time.

Figure 31:
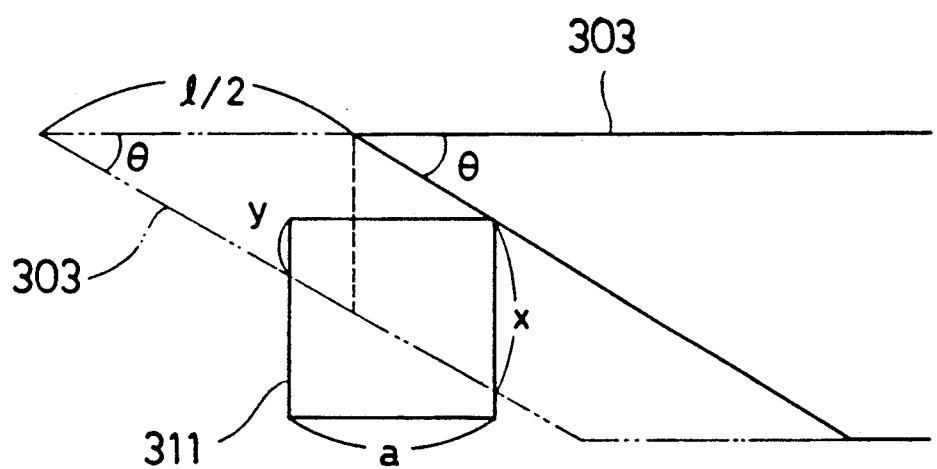

A solid line in FIG. 31 shows the condition under which photointerrupter 311 is not blocked by light-blocking plate 303, while the phantom line in this drawing shows the condition under which photointerrupter is blocked half way. The area of photointerrupter 311 which receives the incident light in the unblocked position is a square with the side equal to a, while in the latter case, the light is shaded on the area which in the vertical direction is defined by length y on the inner side, and by length x on the outer side. The following relationships can be written on the bases of this designation:

$$x+y=a \qquad (41)$$

$$x=y+a\tan\theta \qquad (42)$$

$$x=l/2\tan\theta \qquad (43)$$

Where l is the length of movement of light-blocking plate 303 between the solid line position and the position in which the light is completely blocked.

The following expression can be obtained from equations (41) to (43):

$$\frac{l}{a} = 1 + \frac{1}{\tan\theta} \qquad (44)$$

Formula (44) is an expression which shows an expansion factor of the linear area for head position detector 301. In the case of $\theta$ equal to 45°, the expansion factor is equal to 2, as compared to the case with $\theta=90°$.

Such an expansion is identical both for the direction toward the outer side of light-blocking plate 304 and toward the outer side of head position detector 302.

The above-mentioned embodiment was considered for the case where the position of the optical head is detected by using a light-passing photointerrupter and a light-blocking plate. However, the same results can be obtained with the use of a reflection-type photoreflector and a reflecting plate.

In the case of a reflection-type element, the signal will have polarity opposite to that obtained in the case of a light-passing element. The invention is not limited to application of only a photointerrupter, or a photoreflector, and can be realized with the use of light-emitting and light-receiving elements. In addition, in the case of the reflection system, the reflecting plate can be substituted by an appropriate mark (inside of which the reflection is smaller than outside of the mark) applied onto optical head 404. Enlargement of the zone with linear characteristics of the output signal is equally applicable for the case of a reflecting plate, as well as a mark.

Light-blocking plates on the inner and outer sides can be combined with setting positions of head position detectors 1 and 302. Moreover, head position detectors 301 and 302 can be installed on the optical head, while the light-blocking plates 303 and 304 will be fixed.

Instead of an optical principle, the head position detectors may operates on a magnetic principle, or may have any other suitable construction.

In the illustrated embodiment, stability compensation circuit 307 is based on a phase-lead compensation circuit, but the stability can be compensated also through the velocity feedback line.

D-flip-flop 323 of the position control loop on/off command circuit can be substituted by an R-S flip-flop, or by another latch circuit.

The principle of the invention can also be realized on the basis of a combined use of tracking actuator 412 and head actuator 308. Only a part of the optical head can be made movable.

The head actuator may be a linear-type or a rotary-type actuator.

The above embodiment of the invention is not limited only to optical disk devices. The same principle is applicable to information storage media on magnetic disks, or similar devices which can be traversed by the magnetic head.

It has been shown that when the head is moved away from the working position, it will be moved back to the position determined by the position detector, so that it will be protected from the collision with the stopper, and hence from breakage.

Figure 7:
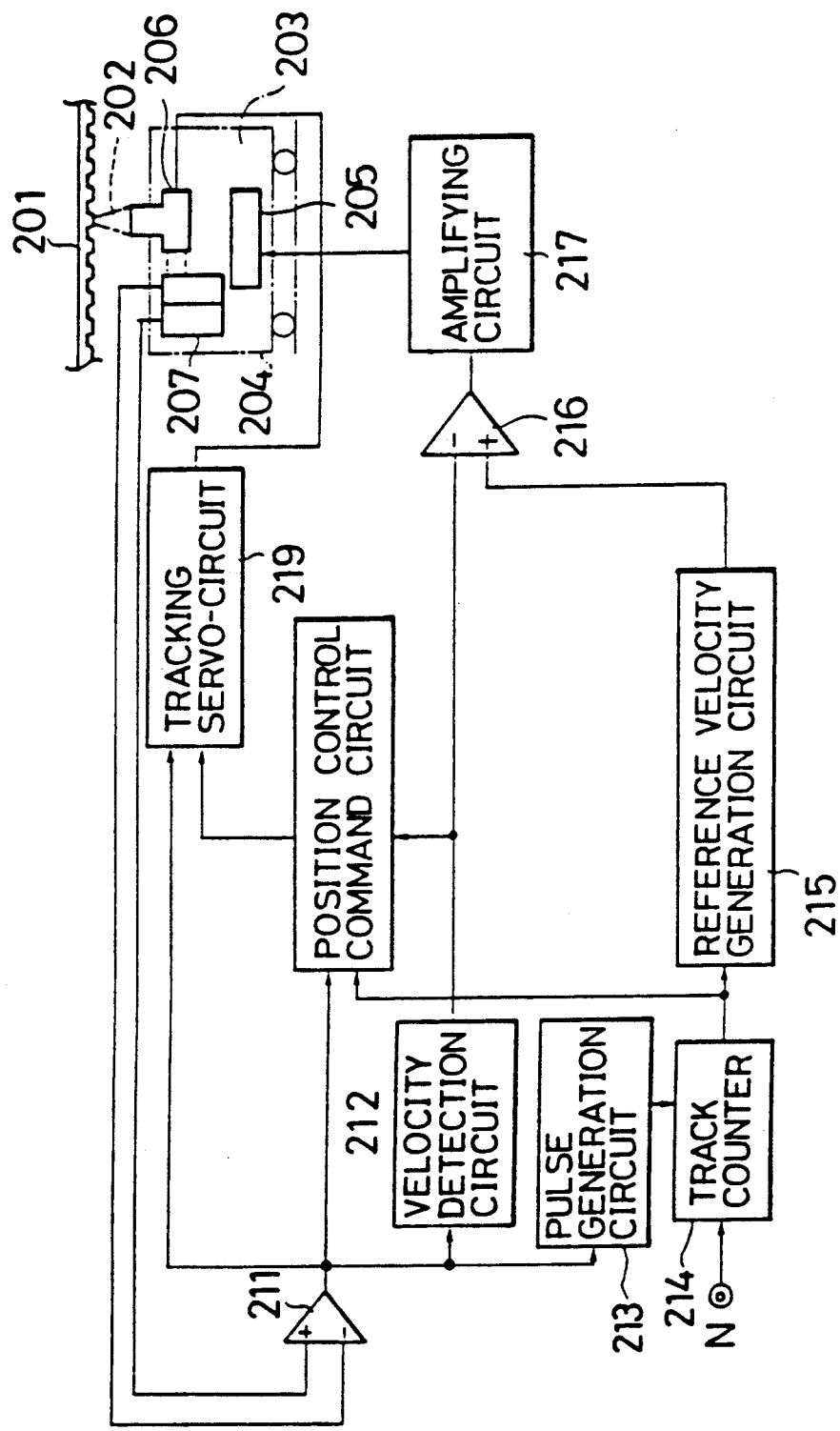
FIG. 7 is a diagram of another known device.
Figure 32:
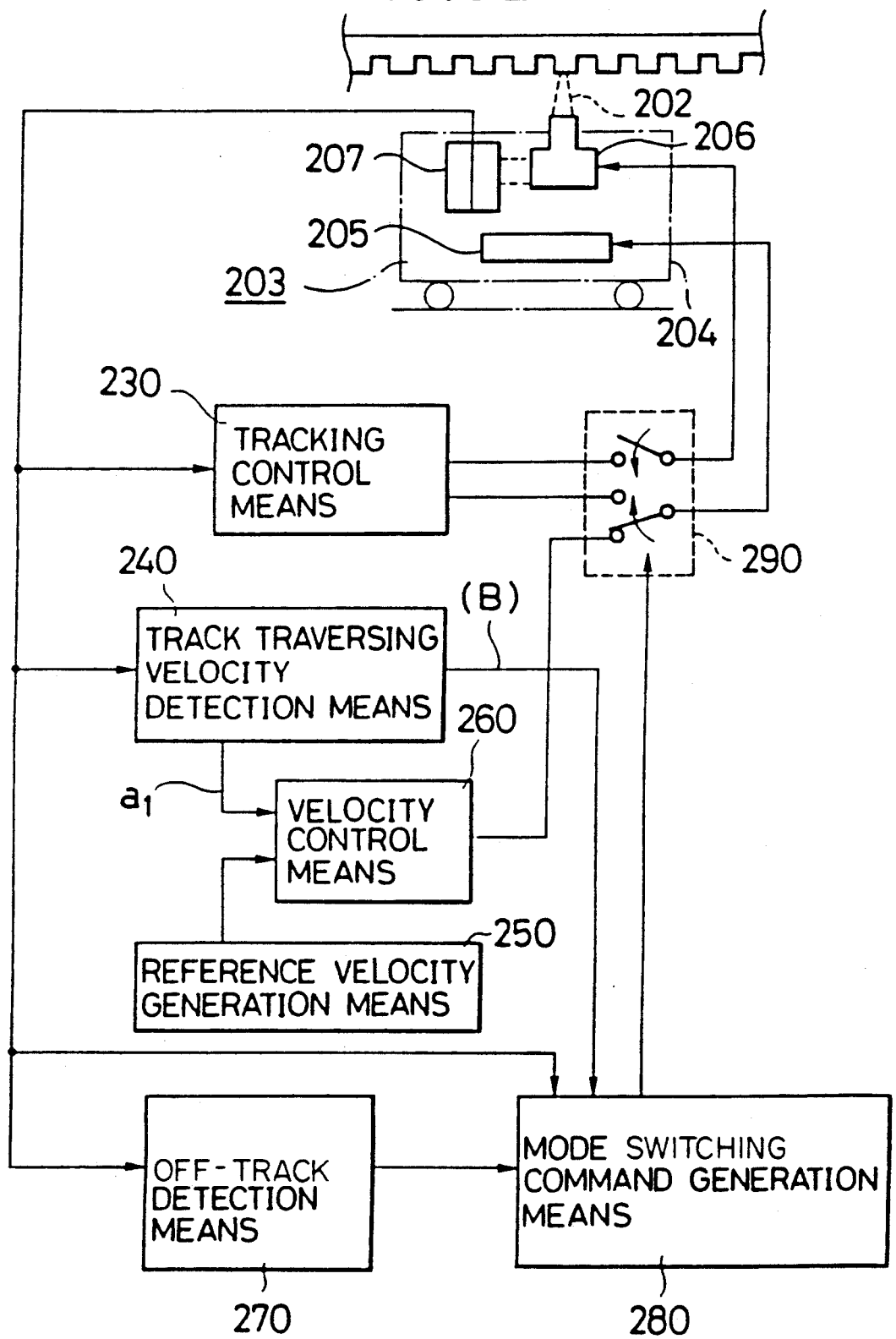
FIG. 32 is a block diagram illustrating a device of in another embodiment of the invention.

FIG. 32 illustrates a system in accordance with another embodiment of the invention. In FIG. 32, reference numerals 201 to 207 designate the same elements as in the previously described known system shown in FIGS. 7 and 8. Reference numeral 230 designates tracking control means, which on the basis of output signals from the photodetector 207, guide the light spot, which is formed by the beam 202, along the center of the track on the optical disk 201. A track traverse velocity detection means 240 detect the track traverse velocity (the velocity with which the light spot traverses the tracks) on the basis of the output from the photodetector. A reference velocity generation means 250 generate a reference velocity which forms a target value for the track traverse velocity (the velocity with which the light spot traverses the tracks). A speed control means 260 control the drive of a linear actuator 205, so that the track traverse velocity detected by the track traverse velocity detection means 240 coincides with the reference velocity, which is output from the reference velocity generation means 250. An off-track detection means 270 detects off-track (departure of the light spot from correct or target track) during movement of the light spot along the center of the track and produces an off-track signal upon detection of the off-track. A mode switching command generation means 280 make switching between the tracking control mode and the velocity control mode on the basis of the track traverse velocity detected by track traverse velocity detection means 240 and the off-track detection signal obtained from the output of the off-track detection means 270. A control mode switching means 290 switches the control mode of the tracking actuator 206, and the linear actuator 205, depending on the command from the output of the mode switching command generation means 280.

Figure 33:
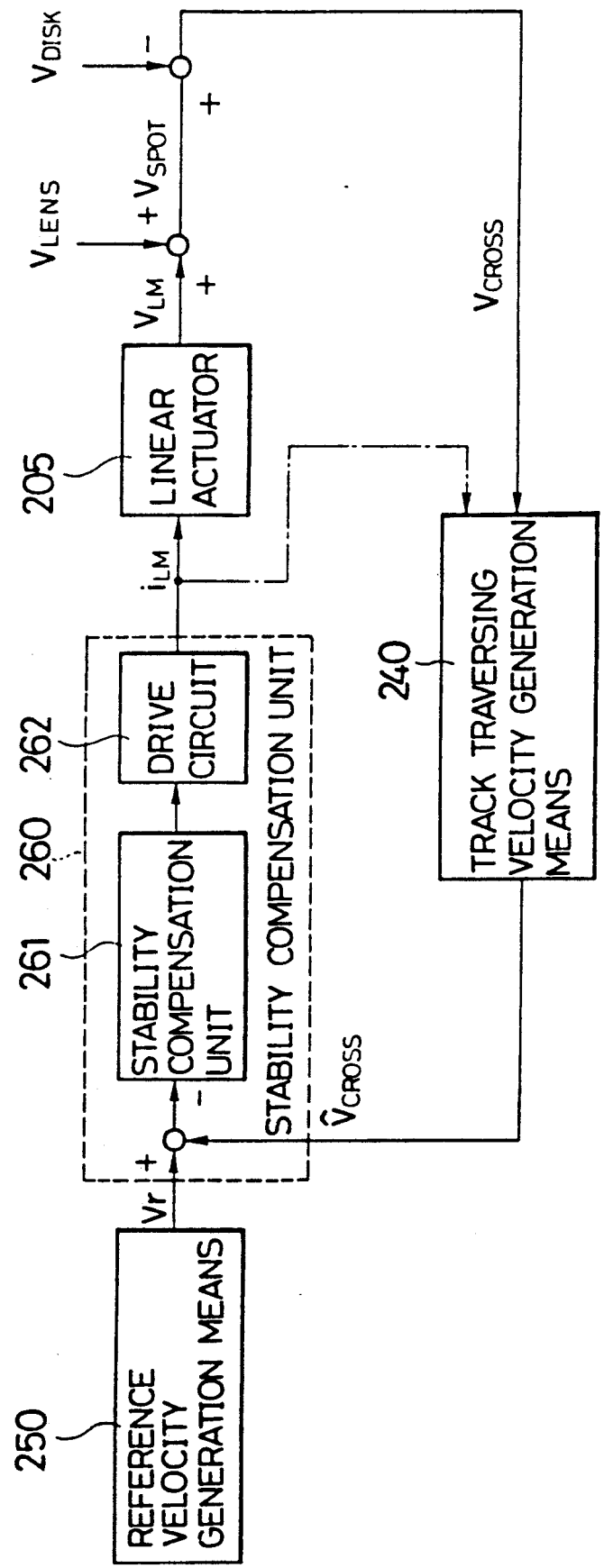
FIG. 33 is block diagram of a velocity control system for the device.

FIG. 33 is a block diagram of a velocity control system which controls the track traverse velocity in the device of the above-described embodiment. In FIG. 33, reference numerals 205, 240, 250 and 260 designate the same elements as those shown in FIG. 32, reference numeral 261 designates a stability compensation unit which is intended for stabilization of the velocity control system and located inside velocity control means 260. In general, a gain element is used for this unit. A drive circuit 262 is intended for driving the linear actuator 205. In general, a constant-current drive circuit is used for this circuit. Operating current $i_{LM}$ is is caused by the drive circuit 262 to flow through the linear actuator 205, so that the linear actuator 205 moves at the velocity $V_{LM}$. The sum of the objective lens velocity $V_{LENS}$ and the linear actuator velocity $V_{LM}$ makes the absolute velocity $V_{SPOT}$ of the light spot, and the difference between the absolute velocity $V_{SPOT}$ and the track fluctuation velocity $V_{DISK}$ of the optical disk 201 makes the track traverse velocity $V_{CROSS}$. The track traverse velocity detecting means 240 detects the track traverse velocity $V_{CROSS}$. The signal indicative of this detected track traverse velocity is denoted by $V_{CROSS}$. Because it is difficult to accurately detect the correct track traverse velocity on the basis of the output from the photodetector 207 alone, the drive current $i_{LM}$ of the linear actuator 205 may be used in combination.

Figure 34:
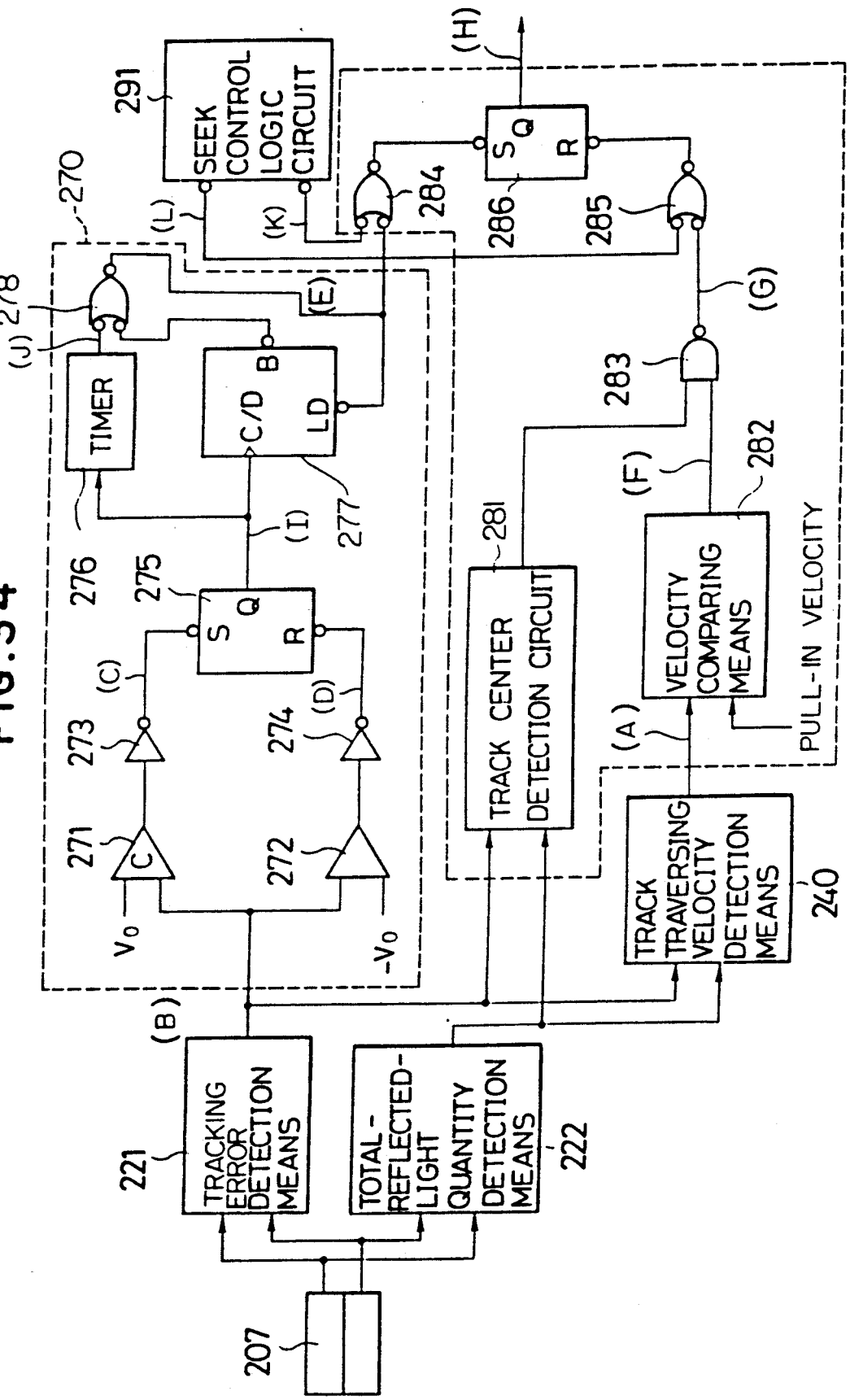
FIG. 34 is a diagram which illustrates some details of the elements of the system.

FIG. 34 is a diagram which is used for a detailed explanation of the off-track detection means 270 and the mode switching command generation means 280, used in the device of the above-described embodiment.

In FIG. 34, reference numerals 207, 240, 270 and 280 designate the same elements which are shown by these reference numerals in FIG. 32. The tracking-error detecting means 221 receive the output of the photodetector 207 and produces a tracking-error signal. The total quantity detecting means 222 receives the output of the photodetector 207, detects the total quantity of the reflected light, and produces a total reflected light quantity signal. The comparator 271 compares the level of the tracking-error signal obtained from the tracking-error detection means 221 with $V_0$. The comparator 272 compares the level of the tracking-error signal from the tracking-error detection means 221 with $-V_0$. The comparators 271 and 272 detect deviation of the light spot from the center of the track exceeding a predetermined distance, and produces on its output a logic signal indicative of the deviation exceeding the predetermined distance. Inverters 273 and 274 invert the polarities of the output signals of the comparators 271 and 272. An RS flip-flop 275 receives on its set and reset terminals respective output signals of the inverters 273 and 274. A timer 276 issues a gate signal of a predetermined duration T (FIG. 36(J)), the gate signal being raised upon transition of the output of the RS flip-flop 275 from the low to high level. A counter 277 is loaded with a predetermined value, e.g., "0" and counts down by "1" each time a pulse is applied to its C/D input from the RS flip-flop 275 (each time its input to its C/D terminal falls from High to Low), and when the result of the count down becomes negative, it produces on its output (B) a Borrow signal. (Because the counter produces the Borrow signal when its count value becomes negative ($-1$) and this Borrow signal is utilized for the generation of the off-track signal, the above-mentioned "predetermined value" should be one short of the number of the tracks upon traverse of which the off-track signal is desired to be produced.) This Borrow signal is applied to an AND gate 278 and is ANDed with the output of the timer 276. The output (E) of the AND gate 278 is the off-track signal which is produced each time the light spot that has deviated from the target track traverses other (neighboring) tracks. This Borrow signal is applied through an AND gate 284 being opened because of its other input (K) being High to a set terminal of an RS flip-flop 286, to set the flip-flop 286, and its output (H) is raised to High.

The off-track signal (E) is also applied to the load terminal (LD) of the counter 277 to load the counter with the predetermined value, e.g., "1." The counter 277 then starts counts down from the predetermined value again.

The function of the timer 276 is to disregard any single high to low transition (at the output of the flip-flop 275) due for example to a defect on the medium.

A track center detection circuit 281 detects the position of the track center on the basis of output signals from the tracking-error detection means 221 and the total-reflected-light-quantity detection means 222. A velocity-comparing means 282 detects the track traverse velocity which is detected by the track-traverse velocity detection means 240, becomes lower than a pull-in velocity (the velocity below which pull-in by the track control means 230 is possible). A NAND gate 283 produces a pulse corresponding to the track center only when the track traverse velocity is below the pull-in velocity (the velocity below which the light spot is capable of being pulled into the tracking control mode (in which it follows the center of the track under the control of the tracking control means). A seek control logic circuit 291 generates a command for switching into the tracking control mode, promptly when the light spot reaches the target track during seeking of a track by means of velocity control of the linear actuator 205. This command is generated in the seek control logic circuit 291 responsive to a pulse indicative of the center of a track after the counter produces the Borrow signal, and is supplied from the mode switching command generation means 280 to the control mode switching means 290. An OR gate 284 sets the flip-flop 286 (by applying a signal to the set terminal of the flip-flop 286) at the time when seek-initiation command is received from the seek control logic circuit 291, or an off-track signal E is received from the counter 277. Another OR gate 285 resets the flip-flop 286 (by applying a signal to the reset terminal of the flip-flop 286), when the seek control logic circuit 291 produces a tracking initiation command, or when a NAND gate 283 produces a track center pulse (at the low velocity period). On the basis of outputs from the OR gates 284 and 285, the RS flip-flop 286 issues a command for switching between the tracking control mode and the velocity control mode.

Figure 35:
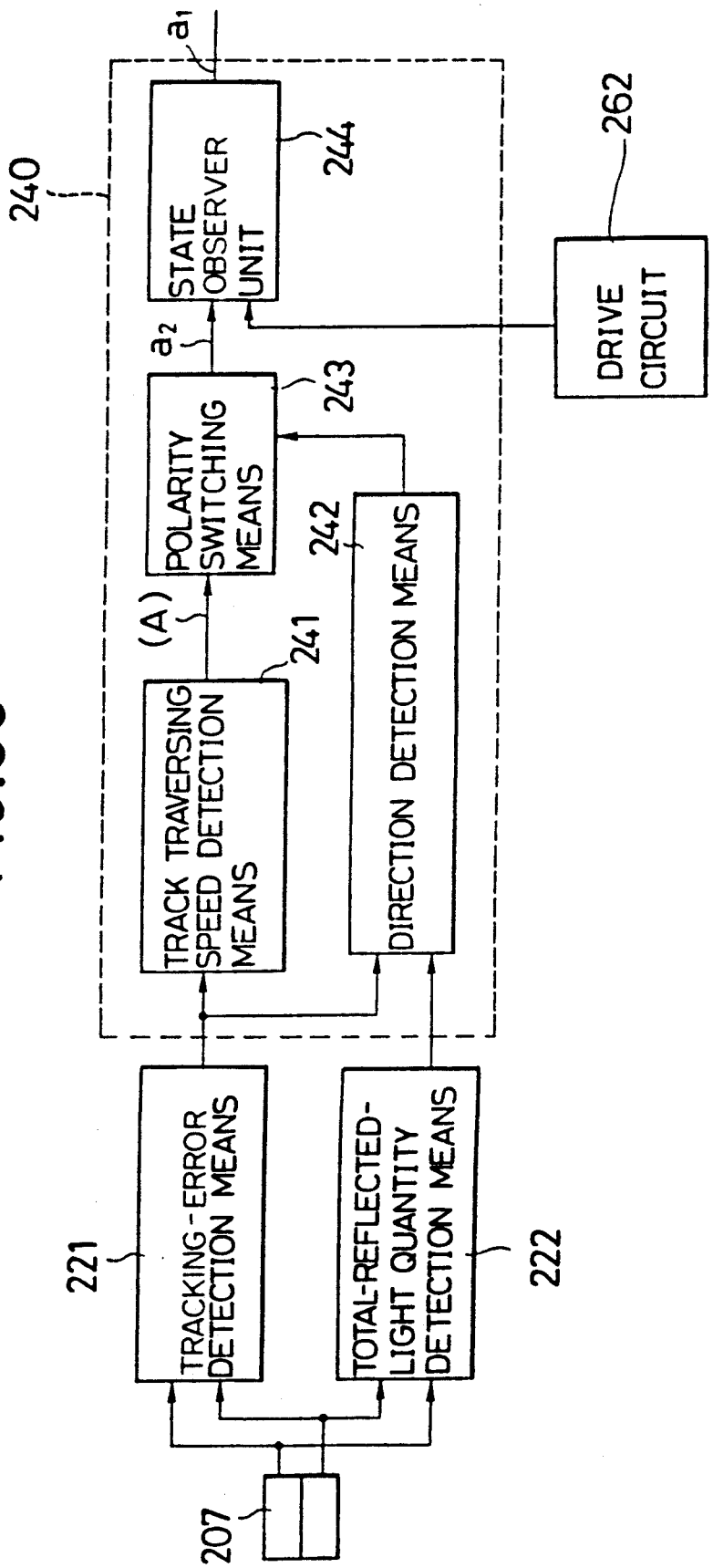
FIG. 35 is a diagram showing details of the track traverse velocity detection means used in the device of the above embodiment.

FIG. 35 illustrates details of the track traverse velocity detection means 240. In FIG. 35, reference numerals 207, 221, 222, 240 and 262 designate identical parts shown in the previous drawings. A track traverse speed detection means 241 detects the track traverse speed (A) from the tracking-error signal. A direction detection means 242 detects from the tracking-error signal and the total-reflected-light-quantity signal, the track-traverse direction (direction in which the light spot traverses the tracks) A polarity switching circuit 243 switches (selects) the polarity of the track traverse speed (A) on the basis of the direction detected by direction detection means. A state-observer unit 244 receives on its input an operating (drive) current signal obtained from the output of the drive circuit 262, as well as a track traverse detection velocity ($a_2$) obtained from the polarity switching circuit 243. On the basis of the signals received, the state-observer unit produces an estimated track traverse velocity ($a_1$) which is more accurate (or has a smaller delay) than the detected velocity ($a_2$).

Figure 36:
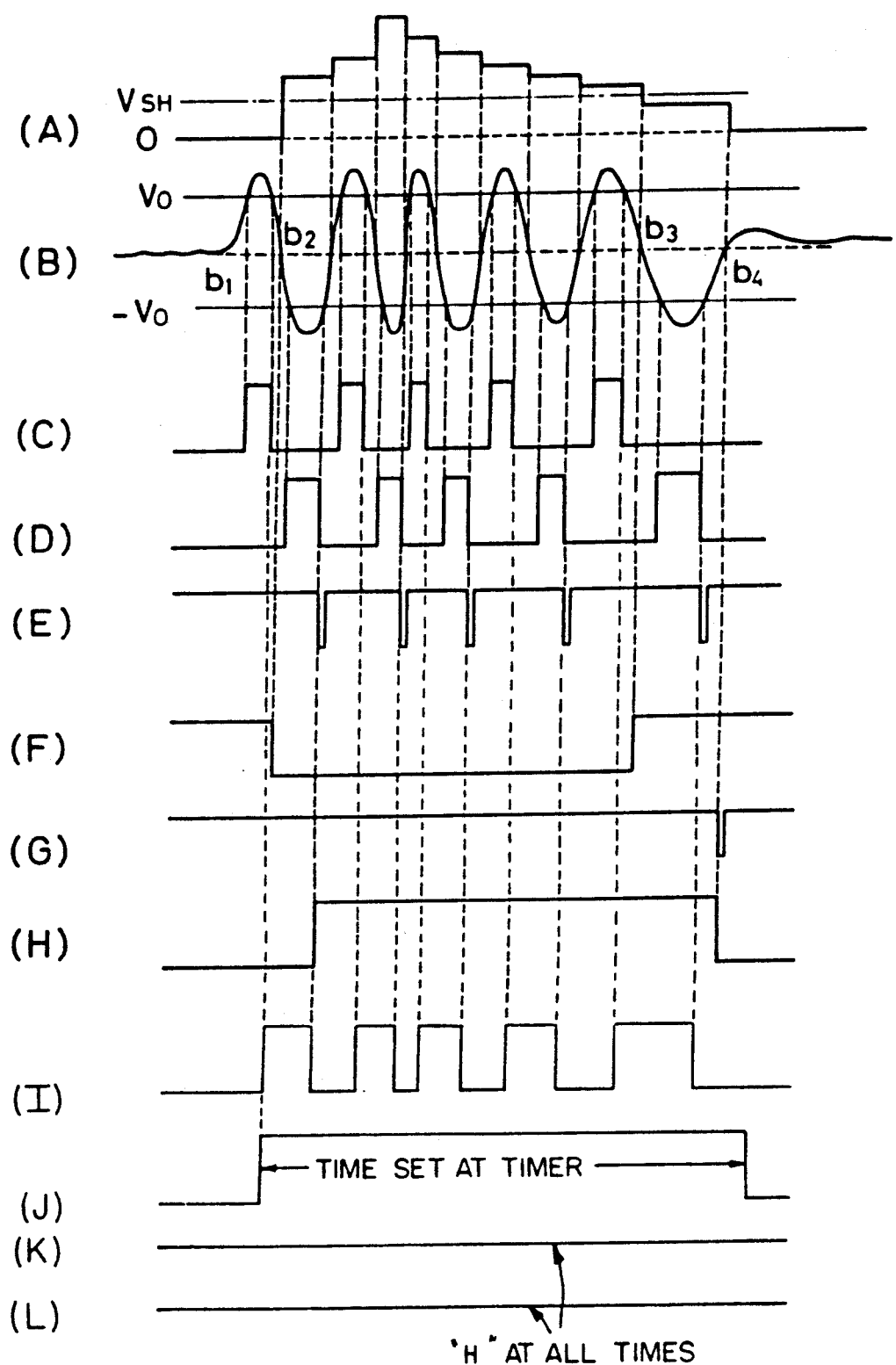
FIGS. 36(a–l) to FIGS. 38(j–l) show waveforms of signals used for explanation of operation of the device.
Figure 37:
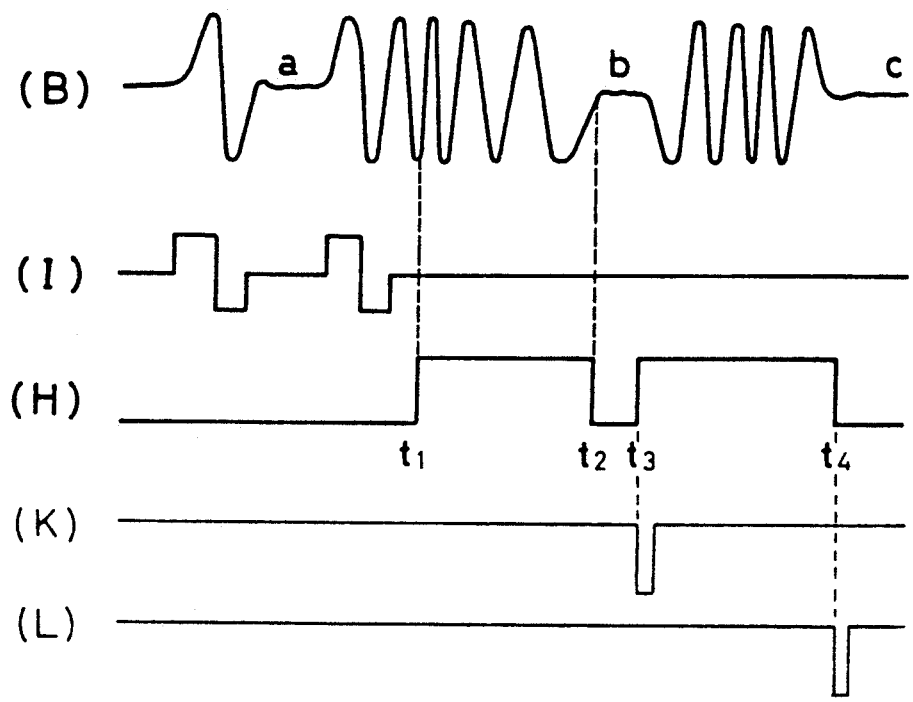
Figure 38:
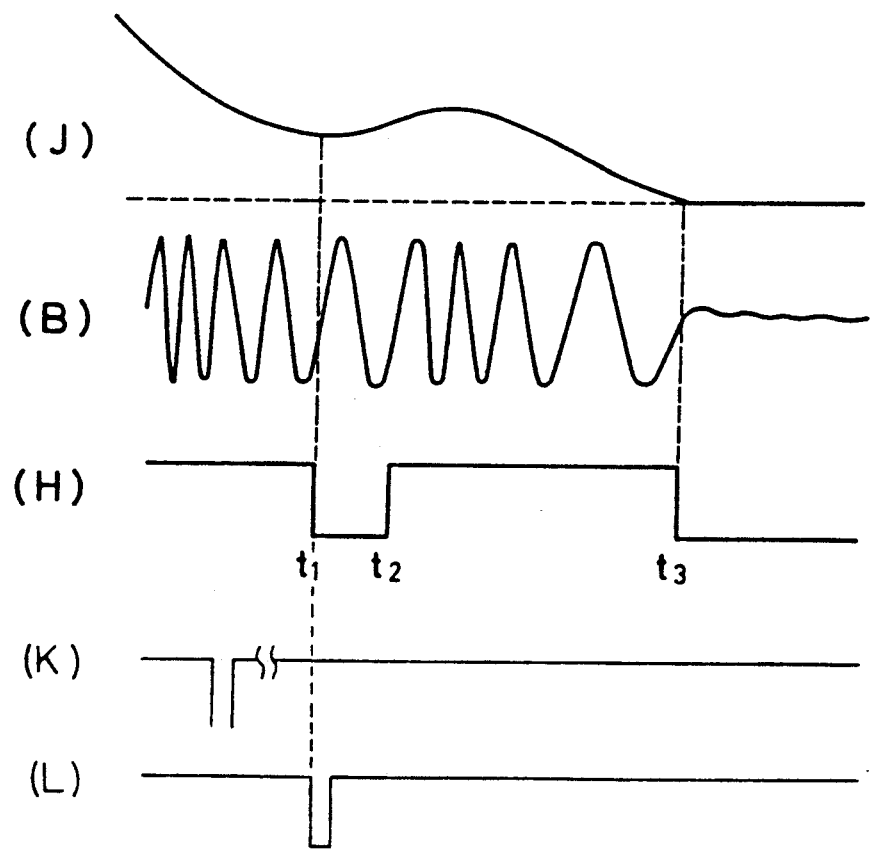

Operation of the system made in accordance with the above embodiment will now be explained with reference to FIG. 36 to FIG. 38. In these drawings, FIG. 36 is used for explaining the case of an off-track under the effect of impact or a similar external factor which may affect the device during tracking. FIG. 37 is a drawing which explains an off-track due to a failure in track-jump operation. FIG. 38 explains operation in the case of an off-track because of a failure in the operation of pull-in by the tracking servo system immediately after a macroseeking operation.

In FIG. 36 to FIG. 38, (A) designates a track traverse speed, (B) designates a tracking-error signal, and (C) and (D) designate results of comparison made by the respective comparators 271 and 272, specifically the outputs of the inverters 273 and 274, shown in FIG. 34. (E) designates an off-track detection signal, (F) is an output of the velocity comparing means 282 which show that the track traverse velocity is lower than the pull-in velocity. (G) designates an output of the NAND gate 283, (H) designates control mode switching command, (I) designates a track-jump pulse, and (J) designates an actual track traverse velocity.

The system described above operates in the following manner: First, as shown in FIG. 32, any off-track, which may occur in the course of movement of the light spot along the center of a track during the tracking control mode, is detected by the off-track detection means 270 on the basis of an output from photodetector 207. The off-track detection signal is transmitted to the mode switching command generation means 280. As a result, the control mode switching means 290 is switched to assume the state opposite to that shown by the arrows (in FIG. 32), so that the system is switched from the tracking control mode of operation performed mainly by the tracking actuator 206, to the velocity control mode of operation by the linear actuator 205.

In this velocity control mode of operation, the reference velocity generation means 250 generate a reference velocity which is lower than the pull-in velocity (the velocity below which which the light spot can be pulled into the tracking mode under the control of the tracking control means 230). For example, when the reference velocity generation means produces an output equal to zero, the track traverse velocity is controlled by the velocity control means 260 so that the track traverse velocity as detected by the track traverse velocity detection means 240 coincide with the reference velocity. In other words, the track traverse velocity is automatically decreased to zero. At the same time, the mode switching command generation means 280 keeps monitoring the output of the track traverse velocity detection means 240, and when it is detected that the light spot has reached the center of a track immediately after the track traverse velocity has fallen below the pull-in velocity, on the basis of the output of the photodetector 207, the tracking control mode command is generated at the seek control logic circuit 291 and supplied through the mode switching command generation means 280 to the control mode switching means 290, which is thereby is switched to the tracking control mode, and tracking control is restarted.

Operation of the system shown in FIG. 34 will now be described in detail with reference to FIG. 36.

If in the course of the track control operation, for some unexpected cause, such as an impact, or a crack on the medium surface of the optical disk 201, the target track may be missed at point $b_1$ (FIG. 36B), then the track traverse speed will be detected as a reciprocal of the time required for a half-period of the tracking-error signal (B), and the track traverse speed will be detected for the first time when the light spot is at a half-tracking-error point $b_2$ (at a point midway between the target track and the adjacent track). Meanwhile, the comparators 271 and 272 compare the level of the tracking-error signal (B) with $V_0$ and $-V_0$ and generate on their outputs track reverse detection pulses (C), and (D). With the use of the RS flip-flop 275, each track traversed by the light spot will be counted down by the counter 277 which will produce a pulse on its output. At the same time, the timer 276 will be reset. For example, if the counter 277 was preliminarily loaded with "1," each time one track is traversed, an off-track detection signal (E) is produced. Under the effect of this signal, the counter 277 will be again loaded with "1," and the RS flip-flop 286 will be set. As a result, the control mode switching command signal (H) will become a velocity control command. In the velocity control mode, the velocity control means will reduce the track traverse velocity until it coincides with the reference velocity (equal, e.g., to zero), and in the center of the track (point $b_4$) where the light spot is positioned at the center of the track immediately after the time point $b_3$ where the reduction of the velocity below $V_{SH}$ (below at which the entering into the tracking operation becomes possible), the track center pulse (G) will reset the RS flip-flop 286, the control mode switching command signal (H) will become the tracking control command, and the light spot will be safely pulled into the center of a track ($b_4$) in the vicinity of the track from which the off-track has occurred. FIG. 36 shows the case in which the light spot is pulled into a center of a track separated by five tracks from the initial track. If the light spot cannot enter the center of the track in point $b_4$ as well, e.g., because of a crack in the medium, the off-track will be detected again, the speed will be reduced through the velocity control mode, and the above-described operation will be repeated until the light spot safely enter the tracking operation.

FIG. 37 illustrates the case where an off-track occurs in track jump. When the tracking actuator 206 is driven under the command of a track-jump operation and an off-track occurs, then similar to the case of FIG. 36, the off-track will be detected at the moment $t_1$ which corresponds to departure by 1 track from the center of the initial track. At the same time, the system will be switched to the velocity control mode, and by means of driving the linear actuator 205 the track traverse velocity is reduced. At point t2, when the velocity becomes below the pull-in velocity, the tracking control means 230 will then again switch the system to the tracking control mode, and in point b a stable tracking becomes possible. This point b is four tracks away from the target track to be reached by the track jump operation. In order to pass from this track position b to the target track, a seek operation over four tracks in the reverse direction is made, taking the time period of from point $t_33$ to point $t_4$, under the command of the seek control logic circuit 291. In this way, the target track is quickly reached.

FIG. 38 illustrates the case where immediately after a macroseeking operation with drive of the linear actuator 205, the system could not enter the tracking. Because at time $t_1$, the light spot has reached the center of the target track during a macroseeking operation, the control mode switching command (H) will be switched from the velocity control mode to the tracking control mode. Because at this moment, however, an actual tracking traverse velocity (J) is higher than required, the light spot cannot be pulled into the center of the target track, and this will cause an off-track. The off-track is detected at time point $t_2$, and the system is switched to the velocity control mode, at time point $t_3$, when the velocity is sufficiently reduced, the system will again be switched to the tracking control mode, so that the light spot will safely enter the tracking position. After that, the macroseeking operation, or the track-jumping operation is repetitively made in the reverse direction, for the same number of tracks for which the light spot has surpassed, similar to the case of FIG. 37.

An example of the velocity detection operation under the velocity control mode will now be described with reference to FIG. 35.

On the basis of an output signal from the photodetector 207, the tracking-error detection means 221 generates a tracking-error signal. The track traverse speed detection means 241 measures the half-period of the tracking-error signal, calculates the reciprocal of this value, and thus determines the track traverse speed. However, this track traverse speed is an absolute value of the velocity. The direction detection means 242 on the other hand detects the track traverse direction. The results of this detection are used for deciding the polarity of the track traverse speed signal (A) and applied to the polarity selecting circuit 243. The polarity selecting circuit 243 combines the speed with the polarity. In other words, it vectorizes the track traverse speed into a track traverse velocity signal $a_2$. The velocity may be controlled by simply making the signal $a_2$ to coincide with the reference velocity. However, the velocity control characteristics will be further improved with the use of the state-observer unit 244, which will produce an estimated track traverse velocity $a_1$ on the basis of the operating-current information of the linear actuator 205 obtained from the drive circuit 262, and performs the control such that the velocity $a_1$ approaches and coincides with the reference velocity. For the velocity signal used for the judgement of whether or not the track traverse velocity is at such a value as to enable the pull-in, either the output of the track traverse velocity detecting means 41 or the output of the state-observer unit 244 may be used.

Figure 39:
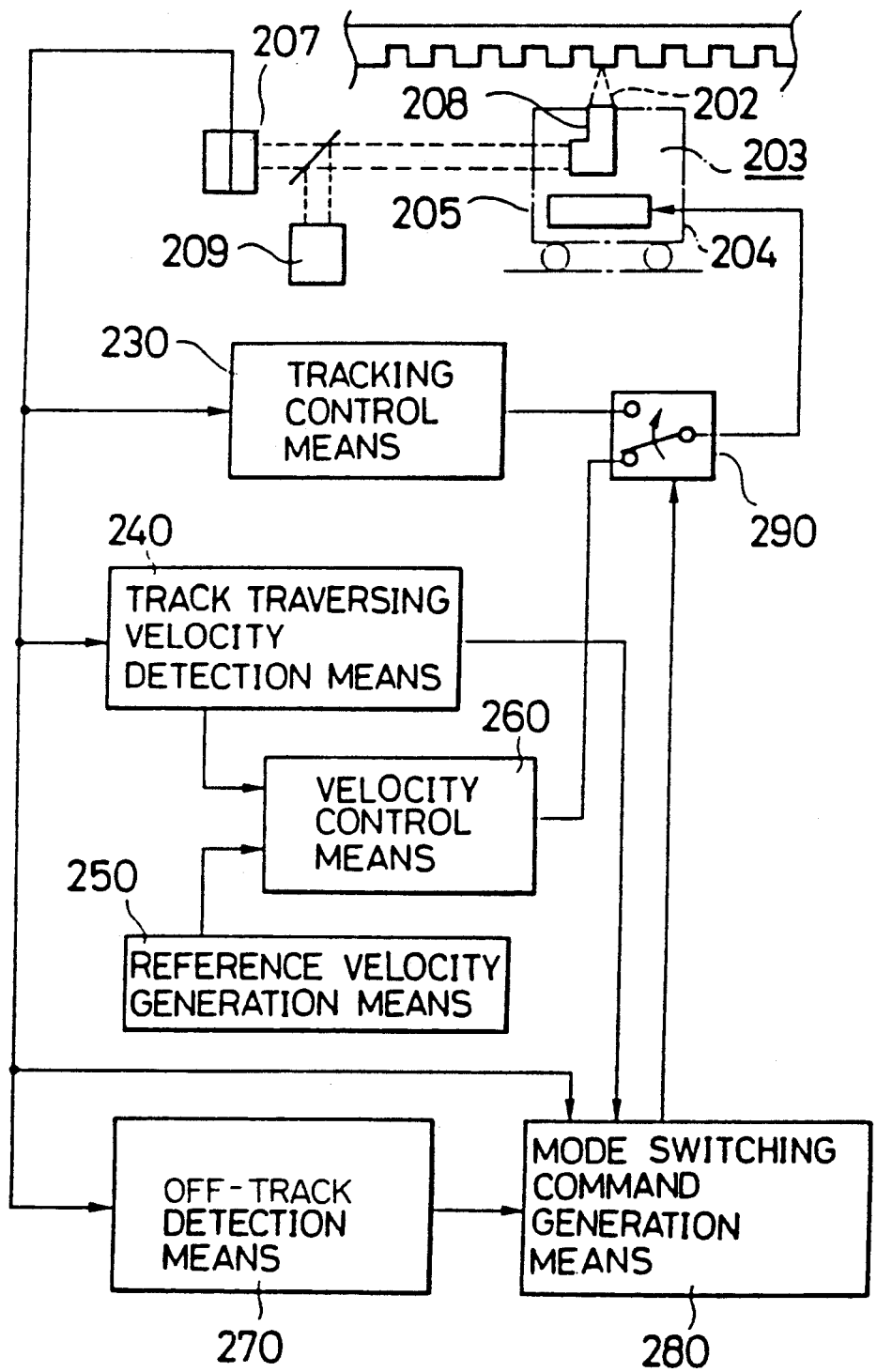
FIG. 39 is a block diagram of a modification of the device of the above embodiment.

FIG. 39 shows a modified form of the system of the present invention. Because in this drawing, the reference numerals identical to those of FIG. 32 designate the same elements, their description is omitted. A laser diode 209 is used as a source of light. An optical system 208 includes a mirror for re-directing the light beam from the laser diode 209, and an objective lens for focusing the light beam 202. The modified system differs from the embodiment of FIG. 32 in that the mass of movable parts is reduced by separating the photodetector 207 and the laser diode 209, which function as the light source, from the remaining elements of the optical head, so that only the linear actuator 205 participates in the tracking motion. The output signals of the control mode switching means 290 are transmitted only to the linear actuator 205. As a result, there is no need for the linear actuator to drive the entire optical head, but rather only its part.

In the modified embodiment, the head actuator comprises a linearly-movable voice-coil type linear motor, but invention is not limited only to this embodiment. For instance, the head actuator may comprise a swing-arm type rotary actuator. Although a tracking actuator 206 is used for reduction of the track traverse velocity, it can be substituted by a linear actuator 205 with a low range of motion, so that the track traverse velocity can be controlled in a wider scope.

In the embodiment illustrated above, the system was described with reference to an optical disk. It is understood however that the invention is not limited only to optical disks and that is equally applicable to magnetic disks or optical cards, provided that they are used in information storage devices and allow for recording, reproducing and erasing on or from the arbitrary information record medium having multiple tracks. The circuitry of the system can be reduced, if immediately after tracking deviation control the same velocity control means are used for the seeking operation.

As has been described above, in the information storage device described above with reference to FIGS. 32 to 39, when an off-track occurs during tracking control this is detected and the control mode is switched into the velocity control mode, and after the track track traverse velocity has been regulated, the control mode is again returned to the tracking control mode. Accordingly, when a large impact is applied from outside or when an off-track occurs due to a large defect or scratch on the information storage medium, or when pull-in fails immediately after seeking, run-out of the head is prevented, and pull-in into a track in the vicinity of the target track can be achieved. It should be noted that this is achieved without resorting to an external scale as in the prior art. Thus, an information storage device which operates at a high speed and which is more reliable is obtained.

What is claimed is:

1. An optical disk drive device comprising:

an optical head which forms a light spot on an optical disk with multiple tracks, and includes a photodetector which receives light reflected from said tracks and provides a photoelectric conversion signal, and a movable part including a lens for focusing said light spot on said optical disk;

a head actuator which is connected to said optical head and which, when said optical head accesses said tracks of said optical disk, moves said movable part in a radial direction of said optical disk;

a motion detection means which is connected to said optical head, and which receives said photoelectric conversion signal produced by said photodetector and produces as output a track-traverse motion signal representing the track-traverse motion of said light spot;

an acceleration detecting means for detecting the acceleration of said head actuator and producing an output signal representative thereof;

a target velocity generating means connected to said acceleration detection means for generating a track-traversing target velocity determined by the output of acceleration detecting means and said photoelectric conversion signal;

a state-observer means which is connected to said acceleration detecting means and said motion detecting means, and which receives as input the output signals from said acceleration detecting means and said motion detecting means, and produces as output an estimated track-traverse velocity of said light spot; and a head actuator drive circuit connected to said target velocity generation means and said state-observer means for controlling said head actuator such that the estimated velocity coincides with said target velocity.

2. The device of claim 1, wherein a cut-off frequency of said state-observer means is lower than a mechanical-resonance frequency of said head actuator or said optical head and the track-traversing frequency of the light spot, but higher than a track fluctuation fundamental frequency.

3. The device of claim 1, further comprising a control mode detection means which is connected to said state-observer means, wherein said state-observer means include an integrator being reset by an output signal from said control mode detection means for resetting during tracking of said tracks by said light spot.

4. The device of claim 1, wherein said acceleration detection means comprises means for detecting the drive current of said head actuator.

5. The optical disk drive device of claim 1, wherein said head actuator is a linear actuator.

6. The optical disk drive device of claim 1, wherein said state-observing means comprises:

a simulator for simulating the nominal transfer characteristics of the head actuator; and a means for combining the output of said motion detection means and said simulator to produce said estimated track-traverse velocity.

7. The device of claim 6, wherein said motion detection means comprises means for detecting the velocity of said movable part of said optical head.

8. The device of claim 7, wherein said means for combining comprises:

a subtractor (14) receiving the detected-velocity from the velocity-detection circuit;

a feedback gain element (11) receiving the output of the subtractor;

an adder (15) adding the output of the feedback gain element (11) and the output of said simulator and producing the sum;

an integrator (12) for integrating the sum output from the adder (12); and a gain element (13) receiving the output of the integrator (12);

said subtractor (14) also receiving the output of said gain element (13) and determining the difference between said estimated velocity and the output of said gain element (13);

the output of said gain element (13) being the estimated track-traverse velocity.

9. The device of claim 6, wherein said motion detection means comprises means for detecting the distance over which said movable part of said optical head has been moved across the tracks.

10. The device of claim 9, wherein said means for combining comprises:

a feedback gain element (12) receiving the detected distance from the distance detection means;

a subtractor (14A) determining the difference between the output of the feedback gain element (12) and the output of said simulator;

a first-order delay element (13) receiving the output of said subtractor (14A);

a gain element (21) receiving the output of said first-order delay element (13);

a feedback gain element (11) receiving the detected distance from the distance detection means; and an adder (15A) for adding the output of the feedback gain element (11) and the output of the gain element (21);

the output of said adder (15A) being the estimated track-traverse velocity.

11. The device of claim 1, wherein said motion detection means comprises means for detecting the velocity of said movable part of said optical head.

12. The device of claim 1, wherein said motion detection means comprises means for detecting the distance over which said movable part of said optical head has been moved across the tracks.

13. An information storage device having a head which can move with respect to an information-storage medium between limits of mobility and can write and read, or erase information on said medium, said information being confined to an operation range on said medium, the device comprising:

a tracking control circuit;

a seek control circuit;

a position control circuit;

a head position detector which is disposed on the inner periphery side or the outer periphery side of said disk, and detects the position of said head when the head is outside of the user utilizable region;

said head position detector producing a signal whose magnitude varies with the position of the head over at least part of the range outside of said user utilizable region;

a head position controller responsive to the signal from said head position detector and performing head position control in which said head is displaced to and maintained at a predetermined position as determined by the output from said position detector; and means for interrupting a tracking or seeking operation when said head traverses said head position detector during the tracking or seeking and causes said head position detector to begin said head position control.

14. A device according to claim 13, wherein said position detector comprises a photocoupler cooperating with a blocking plate moving with said optical head to interrupt the light in the photocoupler when the optical head is outside the user utilizable region.

15. A device according to claim 14, wherein the magnitude of the output of the photocoupler varies linearly with movement of said optical head linearly over said at least part of the range outside the user utilizable region.

16. An information storage device capable of operation in a velocity control mode and a tracking control mode and comprising:

a head having a carriage and a tip, for recording, reproducing and erasing information on and from an information storage medium having multiple tracks;

a tracking actuator installed on said carriage for moving said tip of the head in a track-traverse direction;

a head actuator for driving said carriage in said track-traverse direction so that said tip of the head traverses the tracks;

track control means for controlling, in said tracking control mode, the tracking actuator so that said tip of the head follows the center of a track;

off-track detecting means for detecting the departure of said tip of said head from a track;

means for controlling, in said velocity control mode, the head actuator such that the velocity with which said tip of said head traverses the tracks is reduced to a relatively small value; and mode switching command generation means for switching control of said tip of said head between said velocity control mode and said tracking control mode;

wherein when said off-track detection means detects said departure during tracking control mode, said mode switching command generation means switches to said velocity control mode, and when the track traverse velocity is reduced to the small value said mode switching command generating means switches to said tracking control mode.

17. The device of claim 16, wherein said relatively small value is substantially zero.

18. The device of claim 16, wherein during control of the velocity with which the tracks are traversed by the tip of said head under the effect of said head driving means, the target velocity is set at a value which is lower than a velocity below which pull-in into the tracking on the target track is possible.

19. The device of claim 16, wherein after control of the track traverse velocity under the effect of said head actuator, the track traverse velocity is detected for checking that it is below said velocity with which said track tracking control mode is entered, and the device is again switched to the tracking control mode.

20. The device of claim 16, wherein said information storage medium is an optical disk, and the tip of said head is a light spot.

* * * * *